United States Patent
Ang et al.

(10) Patent No.: US 12,082,133 B2
(45) Date of Patent: Sep. 3, 2024

(54) ALIGNING PAGING OCCASIONS AND SYNCHRONIZATION SIGNAL BLOCKS

(71) Applicant: QUALCOMM Incorporated, San Diego, CA (US)

(72) Inventors: Peter Pui Lok Ang, San Diego, CA (US); Alexei Yurievitch Gorokhov, San Diego, CA (US); Hari Sankar, San Diego, CA (US); Jafar Mohseni, San Diego, CA (US); Huilin Xu, Temecula, CA (US); Linhai He, San Diego, CA (US); Miguel Griot, La Jolla, CA (US); Peter Gaal, San Diego, CA (US); Carsten Aagaard Pedersen, Bolton, MA (US)

( * ) Notice: Subject to any disclaimer, the term of this patent is extended or adjusted under 35 U.S.C. 154(b) by 205 days.

(21) Appl. No.: 17/447,328

(22) Filed: Sep. 10, 2021

(65) Prior Publication Data

US 2023/0081031 A1    Mar. 16, 2023

(51) Int. Cl.
*H04W 56/00* (2009.01)
*H04W 8/02* (2009.01)
*H04W 76/28* (2018.01)

(52) U.S. Cl.
CPC .......... *H04W 56/001* (2013.01); *H04W 8/02* (2013.01); *H04W 76/28* (2018.02)

(58) Field of Classification Search
CPC ...... H04W 56/001; H04W 8/02; H04W 76/28
See application file for complete search history.

(56) References Cited

U.S. PATENT DOCUMENTS

| | | | |
|---|---|---|---|
| 11,382,043 B1* | 7/2022 | Oroskar | H04B 7/024 |
| 2016/0302247 A1* | 10/2016 | Lu | H04W 8/005 |
| 2020/0305118 A1* | 9/2020 | Ryu | H04W 76/10 |
| 2023/0032593 A1* | 2/2023 | Chen | H04W 56/001 |
| 2023/0079204 A1* | 3/2023 | Nader | H04W 68/02 |
| | | | 455/458 |

* cited by examiner

*Primary Examiner* — Ayanah S George

(57) ABSTRACT

Various aspects of the present disclosure generally relate to wireless communication. In some aspects, an AMF may receive, from a user equipment (UE), a communication associated with a request for an identifier. The AMF may transmit, to the UE, the identifier, wherein the identifier is based at least in part on a synchronization signal block (SSB) periodicity and a number of paging frames per discontinuous reception (DRX) cycle. Numerous other aspects are described.

30 Claims, 16 Drawing Sheets

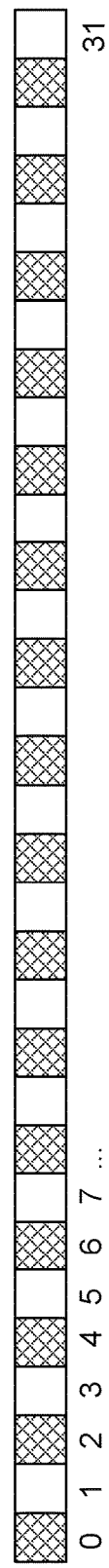
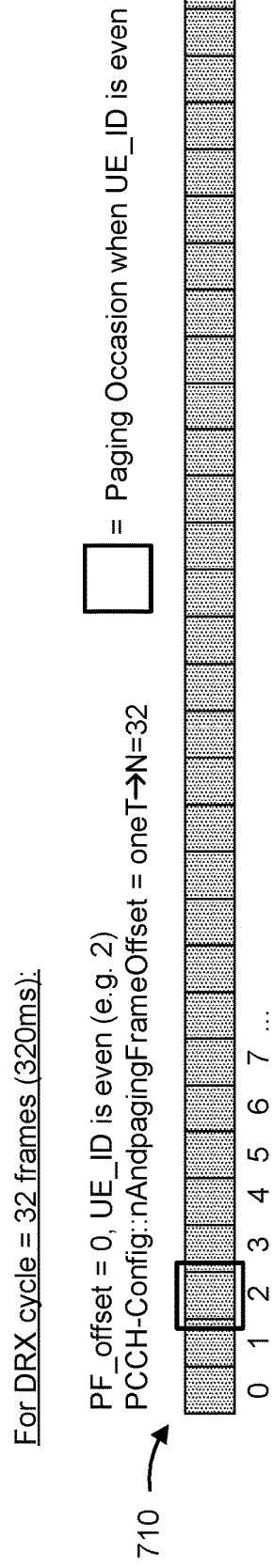
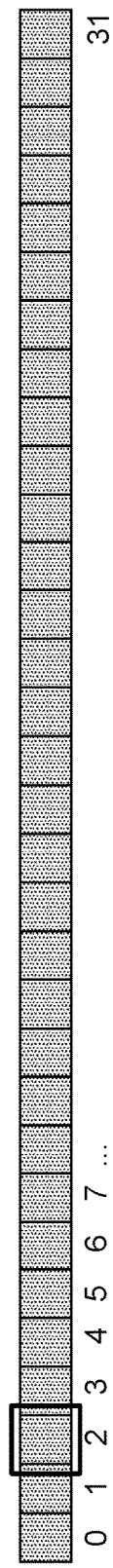
FIG. 7

ALIGNING PAGING OCCASIONS AND SYNCHRONIZATION SIGNAL BLOCKS

FIELD OF THE DISCLOSURE

Aspects of the present disclosure generally relate to wireless communication and to techniques and apparatuses for aligning paging occasions and synchronization signal blocks.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, or the like). Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless network may include one or more base stations that support communication for a user equipment (UE) or multiple UEs. A UE may communicate with a base station via downlink communications and uplink communications. "Downlink" (or "DL") refers to a communication link from the base station to the UE, and "uplink" (or "UL") refers to a communication link from the UE to the base station.

The above multiple access technologies have been adopted in various telecommunication standards to provide a common protocol that enables different UEs to communicate on a municipal, national, regional, and/or global level. New Radio (NR), which may be referred to as 5G, is a set of enhancements to the LTE mobile standard promulgated by the 3GPP. NR is designed to better support mobile broadband internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink, using CP-OFDM and/or single-carrier frequency division multiplexing (SC-FDM) (also known as discrete Fourier transform spread OFDM (DFT-s-OFDM)) on the uplink, as well as supporting beamforming, multiple-input multiple-output (MIMO) antenna technology, and carrier aggregation. As the demand for mobile broadband access continues to increase, further improvements in LTE, NR, and other radio access technologies remain useful.

SUMMARY

Some aspects described herein relate to a method of wireless communication performed by a device. The method may include receiving, from a user equipment (UE), a communication associated with a request for an identifier. The method may include transmitting, to the UE, the identifier, where the identifier is based at least in part on a synchronization signal block (SSB) periodicity and a number of paging frames per discontinuous reception (DRX) cycle.

Some aspects described herein relate to a method of wireless communication performed by a base station. The method may include receiving an identifier associated with a UE. The method may include transmitting, to the UE, the identifier and an identifier adjustment value, where the identifier adjustment value is based at least in part on the identifier, a SSB periodicity, and a number of paging frames per DRX cycle.

Some aspects described herein relate to a method of wireless communication performed by a UE. The method may include receiving, from a base station, a communication indicating an identifier associated with network access and an identifier adjustment value. The method may include monitoring a paging frame during a DRX cycle, where a system frame number of the paging frame is based at least in part on the identifier and the identifier adjustment value.

Some aspects described herein relate to a device for wireless communication. The device may include a memory and one or more processors coupled to the memory. The one or more processors may be configured to receive, from a UE, a communication associated with a request for an identifier. The one or more processors may be configured to transmit, to the UE, the identifier.

Some aspects described herein relate to a base station for wireless communication. The base station may include a memory and one or more processors coupled to the memory. The one or more processors may be configured to receive an identifier associated with a UE. The one or more processors may be configured to transmit, to the UE, the identifier and an identifier adjustment value.

Some aspects described herein relate to a UE for wireless communication. The user equipment may include a memory and one or more processors coupled to the memory. The one or more processors may be configured to receive, from a base station, a communication indicating an identifier associated with network access and an identifier adjustment value. The one or more processors may be configured to monitor a paging frame during a DRX cycle.

Some aspects described herein relate to a non-transitory computer-readable medium that stores a set of instructions for wireless communication by a device. The set of instructions, when executed by one or more processors of the device, may cause the device to receive, from a UE, a communication associated with a request for an identifier. The set of instructions, when executed by one or more processors of the device, may cause the device to transmit, to the UE, the identifier.

Some aspects described herein relate to a non-transitory computer-readable medium that stores a set of instructions for wireless communication by a base station. The set of instructions, when executed by one or more processors of the base station, may cause the base station to receive an identifier associated with a UE. The set of instructions, when executed by one or more processors of the base station, may cause the base station to transmit, to the UE, the identifier and an identifier adjustment value.

Some aspects described herein relate to a non-transitory computer-readable medium that stores a set of instructions for wireless communication by a UE. The set of instructions, when executed by one or more processors of the UE, may cause the UE to receive, from a base station, a communication indicating an identifier associated with network access and an identifier adjustment value. The set of instructions, when executed by one or more processors of the UE, may cause the UE to monitor a paging frame during a DRX cycle.

Some aspects described herein relate to an apparatus for wireless communication. The apparatus may include means for receiving, from a UE, a communication associated with a request for an identifier. The apparatus may include means for transmitting, to the UE, the identifier, where the identifier is based at least in part on a SSB periodicity and a number of paging frames per DRX cycle.

Some aspects described herein relate to an apparatus for wireless communication. The apparatus may include means for receiving an identifier associated with a UE. The apparatus may include means for transmitting, to the UE, the identifier and an identifier adjustment value, where the identifier adjustment value is based at least in part on the identifier, a SSB periodicity, and a number of paging frames per DRX cycle.

Some aspects described herein relate to an apparatus for wireless communication. The apparatus may include means for receiving, from a base station, a communication indicating an identifier associated with network access and an identifier adjustment value. The apparatus may include means for monitoring a paging frame during a DRX cycle, where a system frame number of the paging frame is based at least in part on the identifier and the identifier adjustment value.

Aspects generally include a method, apparatus, system, computer program product, non-transitory computer-readable medium, user equipment, base station, wireless communication device, and/or processing system as substantially described herein with reference to and as illustrated by the drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages, will be better understood from the following description when considered in connection with the accompanying figures. Each of the figures is provided for the purposes of illustration and description, and not as a definition of the limits of the claims.

While aspects are described in the present disclosure by illustration to some examples, those skilled in the art will understand that such aspects may be implemented in many different arrangements and scenarios. Techniques described herein may be implemented using different platform types, devices, systems, shapes, sizes, and/or packaging arrangements. For example, some aspects may be implemented via integrated chip embodiments or other non-module-component based devices (e.g., end-user devices, vehicles, communication devices, computing devices, industrial equipment, retail/purchasing devices, medical devices, and/or artificial intelligence devices). Aspects may be implemented in chip-level components, modular components, non-modular components, non-chip-level components, device-level components, and/or system-level components. Devices incorporating described aspects and features may include additional components and features for implementation and practice of claimed and described aspects. For example, transmission and reception of wireless signals may include one or more components for analog and digital purposes (e.g., hardware components including antennas, radio frequency (RF) chains, power amplifiers, modulators, buffers, processors, interleavers, adders, and/or summers). It is intended that aspects described herein may be practiced in a wide variety of devices, components, systems, distributed arrangements, and/or end-user devices of varying size, shape, and constitution.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

FIG. 7 is a diagram illustrating an example of synchronization signal block (SSB) transmission frames and paging occasions (POs), in accordance with the present disclosure.

DETAILED DESCRIPTION

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. One skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, or the like (collectively referred to as "elements"). These elements may be implemented using hardware, software, or combinations thereof. Whether such elements are implemented as hardware or software depends upon the particular application and design constraints imposed on the overall system.

While aspects may be described herein using terminology commonly associated with a 5G or New Radio (NR) radio access technology (RAT), aspects of the present disclosure can be applied to other RATs, such as a 3G RAT, a 4G RAT, and/or a RAT subsequent to 5G (e.g., 6G).

Figure 1:
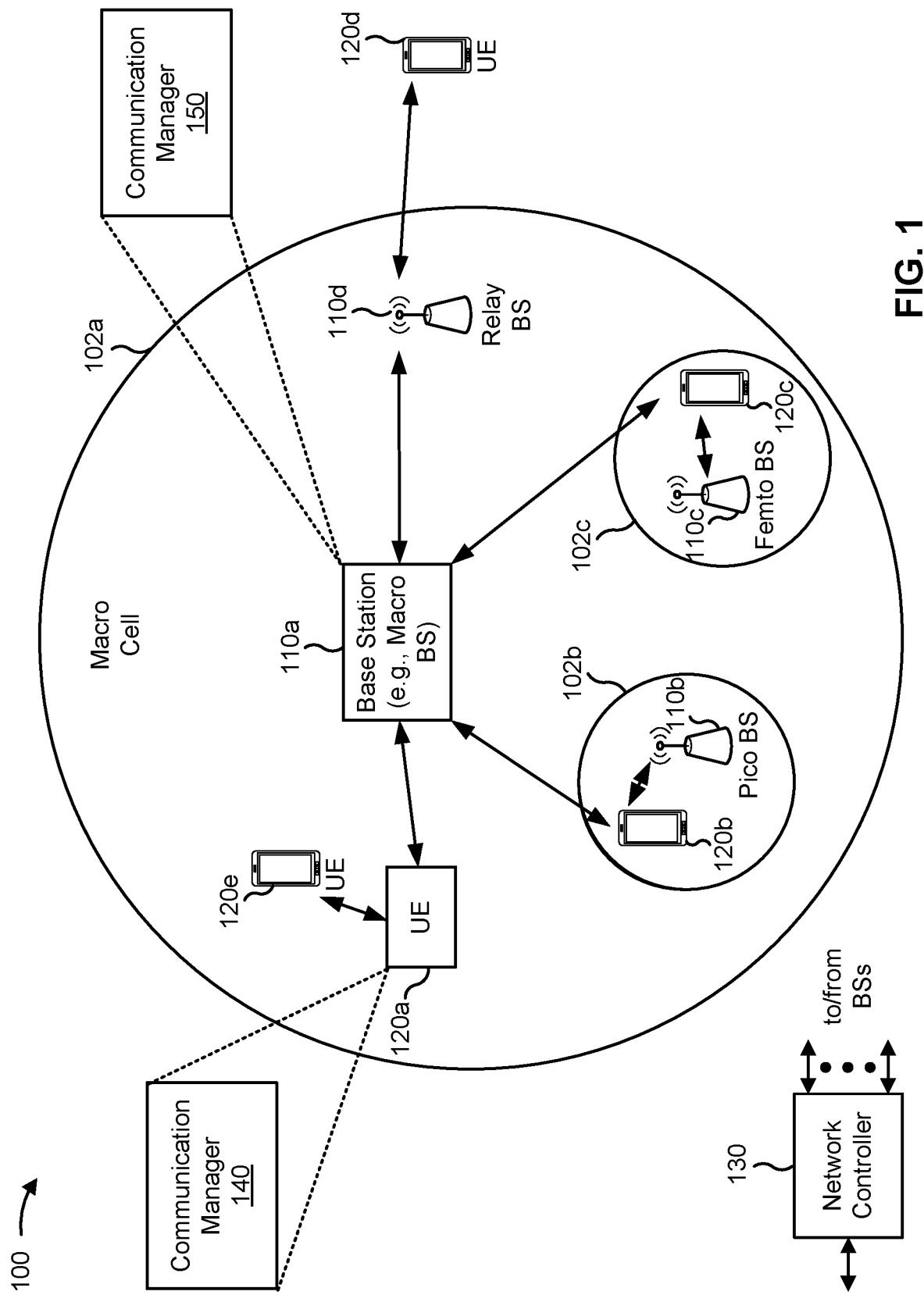
FIG. 1 is a diagram illustrating an example of a wireless network, in accordance with the present disclosure.

FIG. 1 is a diagram illustrating an example of a wireless network 100, in accordance with the present disclosure. The wireless network 100 may be or may include elements of a 5G (e.g., NR) network and/or a 4G (e.g., Long Term Evolution (LTE)) network, among other examples. The wireless network 100 may include one or more base stations 110 (shown as a BS 110a, a BS 110b, a BS 110c, and a BS 110d), a user equipment (UE) 120 or multiple UEs 120 (shown as a UE 120a, a UE 120b, a UE 120c, a UE 120d, and a UE 120e), and/or other network entities. A base station 110 is an entity that communicates with UEs 120. A base station 110 (sometimes referred to as a BS) may include, for example, an NR base station, an LTE base station, a Node B, an eNB (e.g., in 4G), a gNB (e.g., in 5G), an access point, and/or a transmission reception point (TRP). Each base station 110 may provide communication coverage for a particular geographic area. In the 3GPP, the term "cell" can refer to a coverage area of a base station 110 and/or a base station subsystem serving this coverage area, depending on the context in which the term is used.

A base station 110 may provide communication coverage for a macro cell, a pico cell, a femto cell, and/or another type of cell. A macro cell may cover a relatively large geographic area (e.g., several kilometers in radius) and may allow unrestricted access by UEs 120 with service subscriptions. A pico cell may cover a relatively small geographic area and may allow unrestricted access by UEs 120 with service subscription. A femto cell may cover a relatively small geographic area (e.g., a home) and may allow restricted access by UEs 120 having association with the femto cell (e.g., UEs 120 in a closed subscriber group (CSG)). A base station 110 for a macro cell may be referred to as a macro base station. A base station 110 for a pico cell may be referred to as a pico base station. A base station 110 for a femto cell may be referred to as a femto base station or an in-home base station. In the example shown in FIG. 1, the BS 110a may be a macro base station for a macro cell 102a, the BS 110b may be a pico base station for a pico cell 102b, and the BS 110c may be a femto base station for a femto cell 102c. A base station may support one or multiple (e.g., three) cells.

In some examples, a cell may not necessarily be stationary, and the geographic area of the cell may move according to the location of a base station 110 that is mobile (e.g., a mobile base station). In some examples, the base stations 110 may be interconnected to one another and/or to one or more other base stations 110 or network nodes (not shown) in the wireless network 100 through various types of backhaul interfaces, such as a direct physical connection or a virtual network, using any suitable transport network.

The wireless network 100 may include one or more relay stations. A relay station is an entity that can receive a transmission of data from an upstream station (e.g., a base station 110 or a UE 120) and send a transmission of the data to a downstream station (e.g., a UE 120 or a base station 110). A relay station may be a UE 120 that can relay transmissions for other UEs 120. In the example shown in FIG. 1, the BS 110d (e.g., a relay base station) may communicate with the BS 110a (e.g., a macro base station) and the UE 120d in order to facilitate communication between the BS 110a and the UE 120d. A base station 110 that relays communications may be referred to as a relay station, a relay base station, a relay, or the like.

The wireless network 100 may be a heterogeneous network that includes base stations 110 of different types, such as macro base stations, pico base stations, femto base stations, relay base stations, or the like. These different types of base stations 110 may have different transmit power levels, different coverage areas, and/or different impacts on interference in the wireless network 100. For example, macro base stations may have a high transmit power level (e.g., 5 to 40 watts) whereas pico base stations, femto base stations, and relay base stations may have lower transmit power levels (e.g., 0.1 to 2 watts).

A network controller 130 may couple to or communicate with a set of base stations 110 and may provide coordination and control for these base stations 110. The network controller 130 may communicate with the base stations 110 via a backhaul communication link. The base stations 110 may communicate with one another directly or indirectly via a wireless or wireline backhaul communication link.

The UEs 120 may be dispersed throughout the wireless network 100, and each UE 120 may be stationary or mobile. A UE 120 may include, for example, an access terminal, a terminal, a mobile station, and/or a subscriber unit. A UE 120 may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device, a biometric device, a wearable device (e.g., a smart watch, smart clothing, smart glasses, a smart wristband, smart jewelry (e.g., a smart ring or a smart bracelet)), an entertainment device (e.g., a music device, a video device, and/or a satellite radio), a vehicular component or sensor, a smart meter/sensor, industrial manufacturing equipment, a global positioning system device, and/or any other suitable device that is configured to communicate via a wireless medium.

Some UEs 120 may be considered machine-type communication (MTC) or evolved or enhanced machine-type communication (eMTC) UEs. An MTC UE and/or an eMTC UE may include, for example, a robot, a drone, a remote device, a sensor, a meter, a monitor, and/or a location tag, that may communicate with a base station, another device (e.g., a remote device), or some other entity. Some UEs 120 may be considered Internet-of-Things (IoT) devices, and/or may be implemented as NB-IoT (narrowband IoT) devices. Some UEs 120 may be considered a Customer Premises Equipment. A UE 120 may be included inside a housing that houses components of the UE 120, such as processor components and/or memory components. In some examples, the processor components and the memory components may be coupled together. For example, the processor components (e.g., one or more processors) and the memory components (e.g., a memory) may be operatively coupled, communicatively coupled, electronically coupled, and/or electrically coupled.

In general, any number of wireless networks 100 may be deployed in a given geographic area. Each wireless network 100 may support a particular RAT and may operate on one or more frequencies. A RAT may be referred to as a radio technology, an air interface, or the like. A frequency may be referred to as a carrier, a frequency channel, or the like. Each frequency may support a single RAT in a given geographic area in order to avoid interference between wireless networks of different RATs. In some cases, NR or 5G RAT networks may be deployed.

In some examples, two or more UEs 120 (e.g., shown as UE 120a and UE 120e) may communicate directly using one or more sidelink channels (e.g., without using a base station 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol, a vehicle-to-infrastructure (V2I) protocol, or a vehicle-to-pedestrian (V2P) protocol), and/or a mesh network. In such examples, a UE 120 may perform scheduling operations, resource selection operations, and/or other operations described elsewhere herein as being performed by the base station 110.

Devices of the wireless network 100 may communicate using the electromagnetic spectrum, which may be subdivided by frequency or wavelength into various classes, bands, channels, or the like. For example, devices of the wireless network 100 may communicate using one or more operating bands. In 5G NR, two initial operating bands have been identified as frequency range designations FR1 (410 MHz-7.125 GHz) and FR2 (24.25 GHz-52.6 GHz). It should be understood that although a portion of FR1 is greater than 6 GHz, FR1 is often referred to (interchangeably) as a "Sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

The frequencies between FR1 and FR2 are often referred to as mid-band frequencies. Recent 5G NR studies have identified an operating band for these mid-band frequencies as frequency range designation FR3 (7.125 GHz-24.25 GHz). Frequency bands falling within FR3 may inherit FR1 characteristics and/or FR2 characteristics, and thus may effectively extend features of FR1 and/or FR2 into mid-band frequencies. In addition, higher frequency bands are currently being explored to extend 5G NR operation beyond 52.6 GHz. For example, three higher operating bands have been identified as frequency range designations FR4a or FR4-1 (52.6 GHz-71 GHz), FR4 (52.6 GHz-114.25 GHz), and FR5 (114.25 GHz-300 GHz). Each of these higher frequency bands falls within the EHF band.

With the above examples in mind, unless specifically stated otherwise, it should be understood that the term "sub-6 GHz" or the like, if used herein, may broadly represent frequencies that may be less than 6 GHz, may be within FR1, or may include mid-band frequencies. Further, unless specifically stated otherwise, it should be understood that the term "millimeter wave" or the like, if used herein, may broadly represent frequencies that may include mid-band frequencies, may be within FR2, FR4, FR4-a or FR4-1, and/or FR5, or may be within the EHF band. It is contemplated that the frequencies included in these operating bands (e.g., FR1, FR2, FR3, FR4, FR4-a, FR4-1, and/or FR5) may be modified, and techniques described herein are applicable to those modified frequency ranges.

In some aspects, the base station 110 may include a communication manager 150. As described in more detail elsewhere herein, the communication manager 150 may receive an identifier associated with a UE; and transmit, to the UE, the identifier and an identifier adjustment value, wherein the identifier adjustment value is based at least in part on the identifier, a synchronization signal block (SSB) periodicity, and a number of PFs per discontinuous reception (DRX) cycle. Additionally, or alternatively, the communication manager 150 may perform one or more other operations described herein.

In some aspects, the UE 120 may include a communication manager 140. As described in more detail elsewhere herein, the communication manager 140 may receive, from a base station, a communication indicating an identifier associated with network access and an identifier adjustment value; and monitor a PF during a DRX cycle, wherein a system frame number of the PF is based at least in part on the identifier and the identifier adjustment value. Additionally, or alternatively, the communication manager 140 may perform one or more other operations described herein.

As indicated above, FIG. 1 is provided as an example. Other examples may differ from what is described with regard to FIG. 1.

Figure 2:
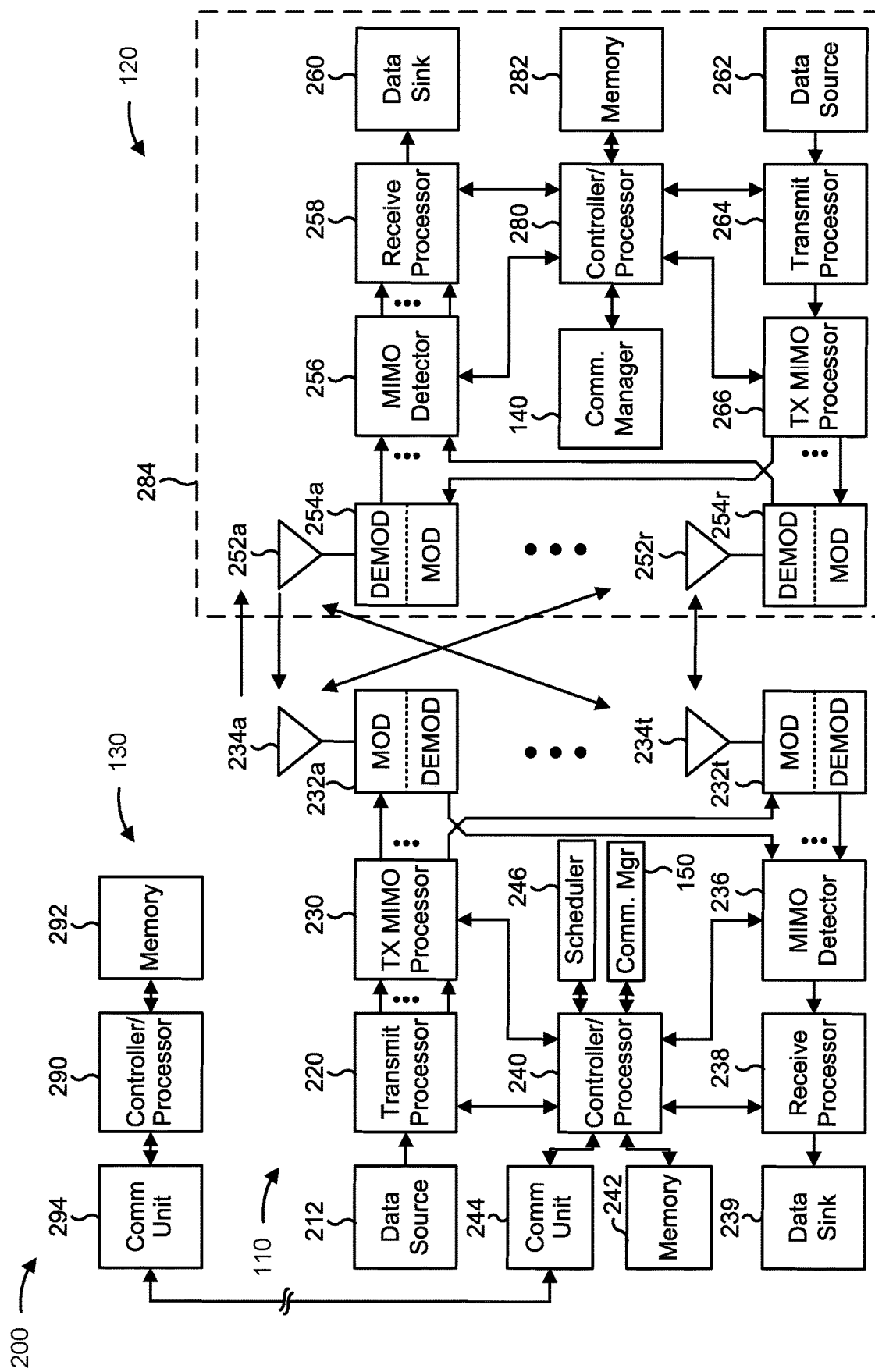
FIG. 2 is a diagram illustrating an example of a base station in communication with a user equipment (UE) in a wireless network, in accordance with the present disclosure.

FIG. 2 is a diagram illustrating an example 200 of a base station 110 in communication with a UE 120 in a wireless network 100, in accordance with the present disclosure. The base station 110 may be equipped with a set of antennas 234a through 234t, such as T antennas (T≥1). The UE 120 may be equipped with a set of antennas 252a through 252r, such as R antennas (R≥1).

At the base station 110, a transmit processor 220 may receive data, from a data source 212, intended for the UE 120 (or a set of UEs 120). The transmit processor 220 may select one or more modulation and coding schemes (MCSs) for the UE 120 based at least in part on one or more channel quality indicators (CQIs) received from that UE 120. The base station 110 may process (e.g., encode and modulate) the data for the UE 120 based at least in part on the MCS(s) selected for the UE 120 and may provide data symbols for the UE 120. The transmit processor 220 may process system information (e.g., for semi-static resource partitioning information (SRPI)) and control information (e.g., CQI requests, grants, and/or upper layer signaling) and provide overhead symbols and control symbols. The transmit processor 220 may generate reference symbols for reference signals (e.g., a cell-specific reference signal (CRS) or a demodulation reference signal (DMRS)) and synchronization signals (e.g., a primary synchronization signal (PSS) or a secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide a set of output symbol streams (e.g., T output symbol streams) to a corresponding set of modems 232 (e.g., T modems), shown as modems 232a through 232t. For example, each output symbol stream may be provided to a modulator component (shown as MOD) of a modem 232. Each modem 232 may use a respective modulator component to process a respective output symbol stream (e.g., for OFDM) to obtain an output sample stream. Each modem 232 may further use a respective modulator component to process (e.g., convert to analog, amplify, filter, and/or upconvert) the output sample stream to obtain a downlink signal. The modems 232a through 232t may transmit a set of downlink signals (e.g., T downlink signals) via a corresponding set of antennas 234 (e.g., T antennas), shown as antennas 234a through 234t.

At the UE 120, a set of antennas 252 (shown as antennas 252a through 252r) may receive the downlink signals from the base station 110 and/or other base stations 110 and may provide a set of received signals (e.g., R received signals) to a set of modems 254 (e.g., R modems), shown as modems 254a through 254r. For example, each received signal may be provided to a demodulator component (shown as DEMOD) of a modem 254. Each modem 254 may use a respective demodulator component to condition (e.g., filter, amplify, downconvert, and/or digitize) a received signal to obtain input samples. Each modem 254 may use a demodulator component to further process the input samples (e.g., for OFDM) to obtain received symbols. A MIMO detector 256 may obtain received symbols from the modems 254, may perform MIMO detection on the received symbols if applicable, and may provide detected symbols. A receive processor 258 may process (e.g., demodulate and decode) the detected symbols, may provide decoded data for the UE 120 to a data sink 260, and may provide decoded control information and system information to a controller/processor 280. The term "controller/processor" may refer to one or more controllers, one or more processors, or a combination thereof. A channel processor may determine a reference signal received power (RSRP) parameter, a received signal strength indicator (RSSI) parameter, a reference signal received quality (RSRQ) parameter, and/or a CQI parameter, among other examples. In some examples, one or more components of the UE 120 may be included in a housing 284.

The network controller 130 may include a communication unit 294, a controller/processor 290, and a memory 292. The network controller 130 may include, for example, one or more devices in a core network. The network controller 130 may communicate with the base station 110 via the communication unit 294.

One or more antennas (e.g., antennas 234a through 234t and/or antennas 252a through 252r) may include, or may be included within, one or more antenna panels, one or more antenna groups, one or more sets of antenna elements, and/or one or more antenna arrays, among other examples. An antenna panel, an antenna group, a set of antenna elements, and/or an antenna array may include one or more antenna elements (within a single housing or multiple housings), a set of coplanar antenna elements, a set of non-coplanar antenna elements, and/or one or more antenna elements coupled to one or more transmission and/or reception components, such as one or more components of FIG. 2.

On the uplink, at the UE 120, a transmit processor 264 may receive and process data from a data source 262 and control information (e.g., for reports that include RSRP, RSSI, RSRQ, and/or CQI) from the controller/processor 280. The transmit processor 264 may generate reference symbols for one or more reference signals. The symbols from the transmit processor 264 may be precoded by a TX MIMO processor 266 if applicable, further processed by the modems 254 (e.g., for DFT-s-OFDM or CP-OFDM), and transmitted to the base station 110. In some examples, the modem 254 of the UE 120 may include a modulator and a demodulator. In some examples, the UE 120 includes a transceiver. The transceiver may include any combination of the antenna(s) 252, the modem(s) 254, the MIMO detector 256, the receive processor 258, the transmit processor 264, and/or the TX MIMO processor 266. The transceiver may be used by a processor (e.g., the controller/processor 280) and the memory 282 to perform aspects of any of the methods described herein (e.g., with reference to FIGS. 8-16).

At the base station 110, the uplink signals from UE 120 and/or other UEs may be received by the antennas 234, processed by the modem 232 (e.g., a demodulator component, shown as DEMOD, of the modem 232), detected by a MIMO detector 236 if applicable, and further processed by a receive processor 238 to obtain decoded data and control information sent by the UE 120. The receive processor 238 may provide the decoded data to a data sink 239 and provide the decoded control information to the controller/processor 240. The base station 110 may include a communication unit 244 and may communicate with the network controller 130 via the communication unit 244. The base station 110 may include a scheduler 246 to schedule one or more UEs 120 for downlink and/or uplink communications. In some examples, the modem 232 of the base station 110 may include a modulator and a demodulator. In some examples, the base station 110 includes a transceiver. The transceiver may include any combination of the antenna(s) 234, the modem(s) 232, the MIMO detector 236, the receive processor 238, the transmit processor 220, and/or the TX MIMO processor 230. The transceiver may be used by a processor (e.g., the controller/processor 240) and the memory 242 to perform aspects of any of the methods described herein (e.g., with reference to FIGS. 8-16).

The controller/processor 240 of the base station 110, the controller/processor 280 of the UE 120, and/or any other component(s) of FIG. 2 may perform one or more techniques associated with aligning POs and synchronization signal blocks, as described in more detail elsewhere herein. For example, the controller/processor 240 of the base station 110, the controller/processor 280 of the UE 120, and/or any other component(s) of FIG. 2 may perform or direct operations of, for example, process 1100 of FIG. 11, process 1200 of FIG. 12, process 1300 of FIG. 13, and/or other processes as described herein. The memory 242 and the memory 282 may store data and program codes for the base station 110 and the UE 120, respectively. In some examples, the memory 242 and/or the memory 282 may include a non-transitory computer-readable medium storing one or more instructions (e.g., code and/or program code) for wireless communication. For example, the one or more instructions, when executed (e.g., directly, or after compiling, converting, and/or interpreting) by one or more processors of the base station 110 and/or the UE 120, may cause the one or more processors, the UE 120, and/or the base station 110 to perform or direct operations of, for example, process 1100 of FIG. 11, process 1200 of FIG. 12, process 1300 of FIG. 13, and/or other processes as described herein. In some examples, executing instructions may include running the instructions, converting the instructions, compiling the instructions, and/or interpreting the instructions, among other examples.

In some aspects, the base station includes means for receiving an identifier associated with a UE; and/or means for transmitting, to the UE, the identifier and an identifier adjustment value, wherein the identifier adjustment value is based at least in part on the identifier, an SSB periodicity, and a number of PFs per DRX cycle. The means for the base station to perform operations described herein may include, for example, one or more of communication manager 150, transmit processor 220, TX MIMO processor 230, modem 232, antenna 234, MIMO detector 236, receive processor 238, controller/processor 240, memory 242, or scheduler 246.

In some aspects, the UE includes means for receiving, from a base station, a communication indicating an identifier associated with network access and an identifier adjustment value; and/or means for monitoring a PF during a DRX cycle, wherein a system frame number of the PF is based at least in part on the identifier and the identifier adjustment value. The means for the UE to perform operations described herein may include, for example, one or more of communication manager 140, antenna 252, modem 254, MIMO detector 256, receive processor 258, transmit processor 264, TX MIMO processor 266, controller/processor 280, or memory 282.

While blocks in FIG. 2 are illustrated as distinct components, the functions described above with respect to the blocks may be implemented in a single hardware, software, or combination component or in various combinations of components. For example, the functions described with respect to the transmit processor 264, the receive processor 258, and/or the TX MIMO processor 266 may be performed by or under the control of the controller/processor 280.

As indicated above, FIG. 2 is provided as an example. Other examples may differ from what is described with regard to FIG. 2.

Figure 3:
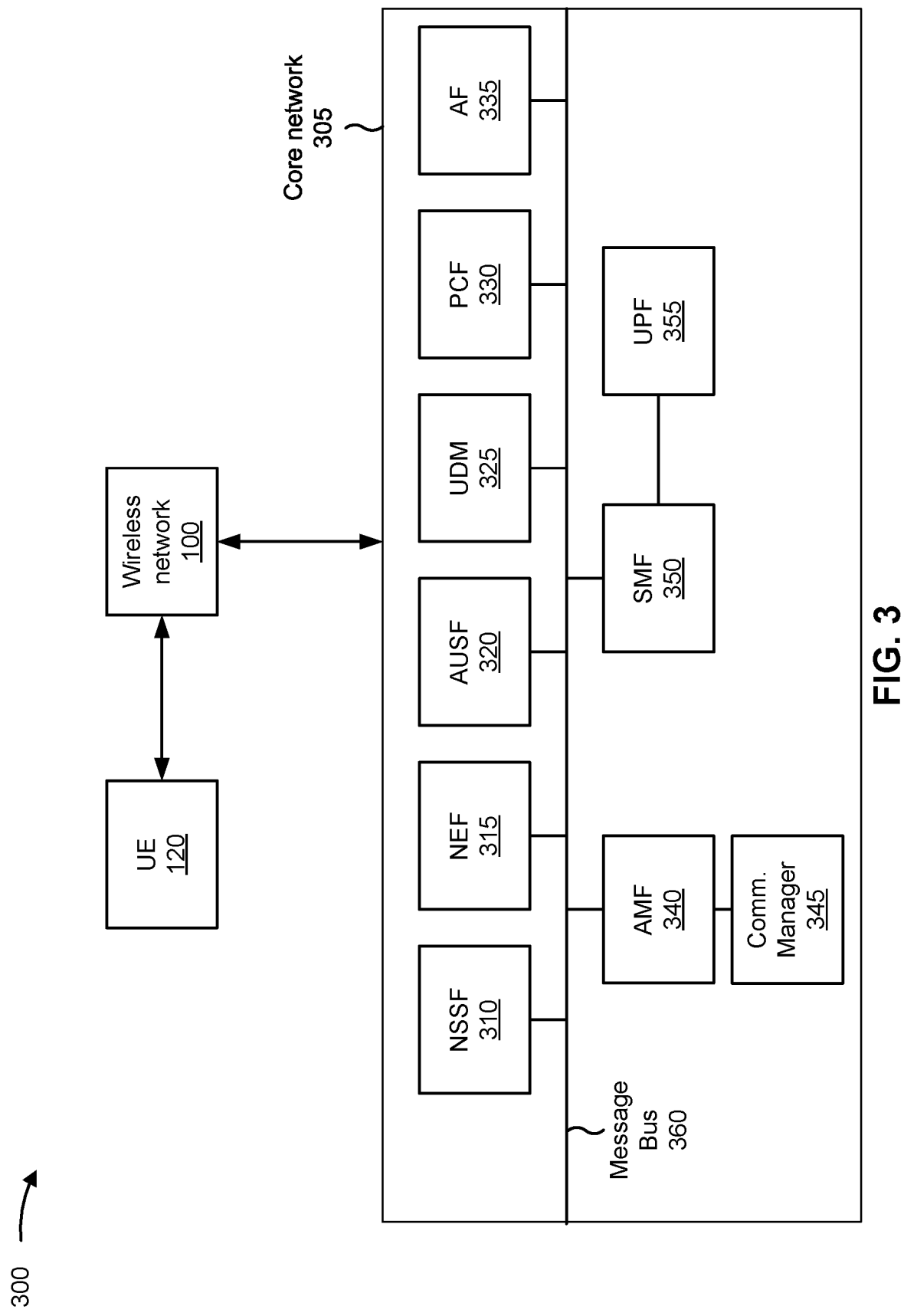
FIG. 3 is a diagram illustrating an example of a core network, in accordance with the present disclosure.

FIG. 3 is a diagram of an example 300 of a core network 305, in accordance with the present disclosure. As shown in FIG. 3, example 300 may include a UE (e.g., UE 120), a wireless communication network 100, and a core network 305. Devices and/or networks of example 300 may interconnect via wired connections, wireless connections, or a combination thereof.

The wireless communication network 100 may support, for example, a cellular RAT. The network 100 may include one or more base stations (e.g., base station 110) and other network entities that can support wireless communication for the UE 120. The network 100 may transfer traffic between the UE 120 (e.g., using a cellular RAT), one or more base stations (e.g., using a wireless interface or a backhaul interface, such as a wired backhaul interface), and/or the core network 305. The network 100 may provide one or more cells that cover geographic areas.

In some aspects, the network 100 may perform scheduling and/or resource management for the UE 120 covered by the network 100 (e.g., the UE 120 covered by a cell provided by the network 100). In some aspects, the network 100 may be controlled or coordinated by a network controller (e.g., network controller 130 of FIG. 1), which may perform load balancing, network-level configuration, and/or the like. As described above in connection with FIG. 1, the network controller may communicate with the network 100 via a wireless or wireline backhaul. In some aspects, the network 100 may include a network controller, a self-organizing network (SON) module or component, or a similar module or component. Accordingly, the network 100 may perform network control, scheduling, and/or network management functions (e.g., for uplink, downlink, and/or sidelink communications of the UE 120 covered by the network 100).

In some aspects, the core network 305 may include an example functional architecture in which systems and/or methods described herein may be implemented. For example, the core network 305 may include an example architecture of a fifth generation (5G) next generation (NG) core network included in a 5G wireless telecommunications system. Although the example architecture of the core network 305 shown in FIG. 3 may be an example of a service-based architecture, in some aspects, the core network 305 may be implemented as a reference-point architecture, a 4G core network, and/or the like.

As shown in FIG. 3, the core network 305 may include a number of functional elements. The functional elements may include, for example, a network slice selection function (NSSF) 310, a network exposure function (NEF) 315, an authentication server function (AUSF) 320, a unified data management (UDM) component 325, a policy control function (PCF) 330, an application function (AF) 335, an AMF 340, a session management function (SMF) 350, a user plane function (UPF) 355, and/or the like. These functional elements may be communicatively connected via a message bus 360. Each of the functional elements shown in FIG. 3 may be implemented on one or more devices associated with a wireless telecommunications system. In some implementations, one or more of the functional elements may be implemented on physical devices, such as an access point, a base station, a gateway, and/or the like. In some implementations, one or more of the functional elements may be implemented on a computing device of a cloud computing environment.

The NSSF 310 may include one or more devices that select network slice instances for the UE 120. Network slicing is a network architecture model in which logically distinct network slices operate using common network infrastructure. For example, several network slices may operate as isolated end-to-end networks customized to satisfy different target service standards for different types of applications executed, at least in part, by the UE 120 and/or communications to and from the UE 120.

The NEF 315 may include one or more devices that support exposure of capabilities and/or events in the wireless telecommunications system to help other entities in the wireless telecommunications system discover network services. The AUSF 320 may include one or more devices that act as an authentication server and support the process of authenticating the UE 120 in the wireless telecommunications system.

The UDM 325 may include one or more devices that store user data and profiles in the wireless telecommunications system. In some aspects, the UDM 325 may be used for fixed access, mobile access, and/or the like, in the core network 305.

The PCF 330 may include one or more devices that provide a policy framework that incorporates network slicing, roaming, packet processing, mobility management, and/or the like The AF 335 may include one or more devices that support application influence on traffic routing, access to the NEF 315, policy control, and/or the like. The AMF 340 may include one or more devices that act as a termination point for non-access stratum (NAS) signaling, mobility management, and/or the like. In some aspects the AMF may also be responsible for distributing short temporary mobile subscription identifiers (S-TMSIs) to UEs. The S-TMSI is a shortened form of a global unique temporary identifier (GUTI) and may be a concatenation of an AMF set identity (10 bits), an AMF pointer (10 bits), and a 5G TMSI (32 bits). In some aspects, the 10 least significant bits of the S-TMSI are used to determine PFs and POs for UEs. For example, the PF and PO for paging may be determined by the following formulae:

The system frame number (SFN) for the PF is determined by:

$(SFN+PF\_offset) \bmod T = (T \div N)*(UE\_ID \bmod V)$

Index (i_s), indicating the index of the PO is determined by:

$i\_s = \mathrm{floor}(UE\_ID/N) \bmod Ns$

In the foregoing, T is determined by a shortest of UE specific DRX value(s), if configured by radio resource control (RRC) and/or upper layers, and a default DRX value broadcast in system information. N is a total number of PFs in T Ns is a number of POs for a PF. PF_offset is used for PF determination (e.g., a PF_offset indicates a number of frames a PF is offset by). UE_ID is the 10 least significant bits of the S-TMSI.

The AMF is responsible for allocating S-TMSIs in a manner than distributes the S-TMSIs across PFs and POs (e.g., to ensure network paging communications are distributed in the time domain at different PFs and POs).

In some aspects, the AMF may include a communication manager 345. As described in more detail elsewhere herein, the communication manager 345 may receive, from a UE, a communication associated with a request for an identifier; and transmit, to the UE, the identifier, wherein the identifier is based at least in part on a SSB periodicity and a number of PFs per DRX cycle. Additionally, or alternatively, the communication manager 345 may perform one or more other operations described herein.

The SMF 350 may include one or more devices that support the establishment, modification, and release of communication sessions in the wireless telecommunications system. For example, the SMF 350 may configure traffic steering policies at the UPF 355, enforce user equipment Internet Protocol (IP) address allocation and policies, and/or the like.

The UPF 355 may include one or more devices that serve as an anchor point for intraRAT and/or interRAT mobility. In some aspects, the UPF 355 may apply rules to packets, such as rules pertaining to packet routing, traffic reporting, handling user plane QoS, and/or the like.

The message bus 360 may be a logical and/or physical communication structure for communication among the functional elements. Accordingly, the message bus 360 may permit communication between two or more functional elements, whether logically (e.g., using one or more application programming interfaces (APIs) and/or the like) and/or physically (e.g., using one or more wired and/or wireless connections).

The number and arrangement of devices and networks shown in FIG. 3 are provided as an example. In practice, there may be additional devices and/or networks, fewer devices and/or networks, different devices and/or networks, or differently arranged devices and/or networks than those shown in FIG. 3. Furthermore, two or more devices shown in FIG. 3 may be implemented within a single device, or a single device shown in FIG. 3 may be implemented as multiple, distributed devices. Additionally, or alternatively, a set of devices (e.g., one or more devices) of example 300 may perform one or more functions described as being performed by another set of devices of example environment 300.

As indicated above, FIG. 3 is provided as an example. Other examples may differ from what is described with regard to FIG. 3.

Figure 4:
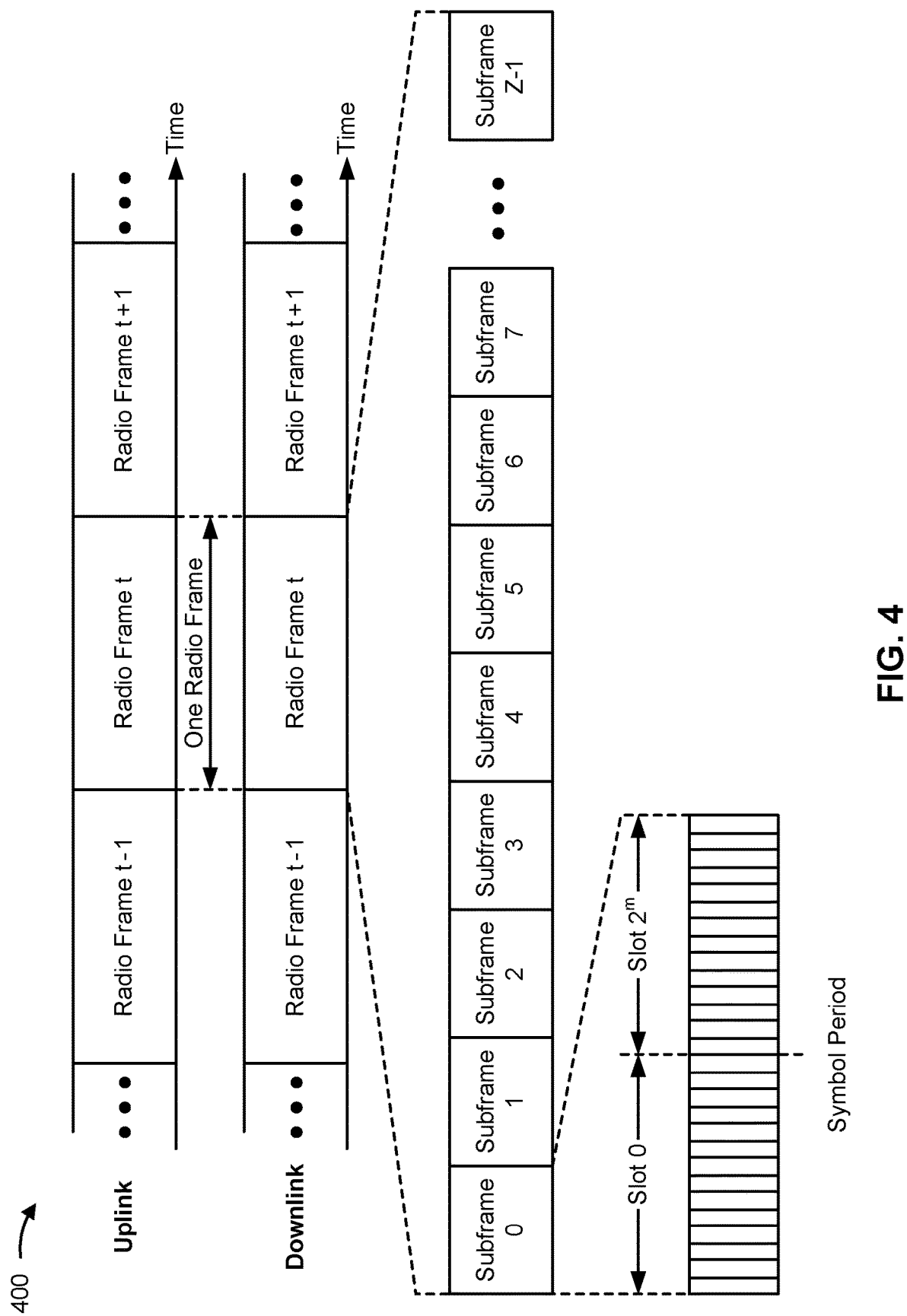
FIG. 4 is a diagram illustrating an example of a frame structure in a wireless communication network, in accordance with the present disclosure.

FIG. 4 is a diagram illustrating an example 400 of a frame structure in a wireless communication network, in accordance with the present disclosure. The frame structure shown in FIG. 4 is for frequency division duplexing (FDD) in a telecommunication system, such as LTE or NR. The transmission timeline for each of the downlink and uplink may be partitioned into units of radio frames (sometimes referred to as frames). Each radio frame may have a predetermined duration (e.g., 10 milliseconds (ms)) and may be partitioned into a set of Z (Z≥1) subframes (e.g., with indices of 0 through Z−1). Each subframe may have a predetermined duration (e.g., 1 ms) and may include a set of slots (e.g., 2m slots per subframe are shown in FIG. 4, where m is an index of a numerology used for a transmission, such as 0, 1, 2, 3, 4, or another number). Each slot may include a set of L symbol periods. For example, each slot may include fourteen symbol periods (e.g., as shown in FIG. 4), seven symbol periods, or another number of symbol periods. In a case where the subframe includes two slots (e.g., when m=1), the subframe may include 2L symbol periods, where the 2L symbol periods in each subframe may be assigned indices of 0 through 2L−1. In some aspects, a scheduling unit for the FDD may be frame-based, subframe-based, slot-based, mini-slot based, or symbol-based.

As indicated above, FIG. 4 is provided as an example. Other examples may differ from what is described with respect to FIG. 4.

Figure 5:
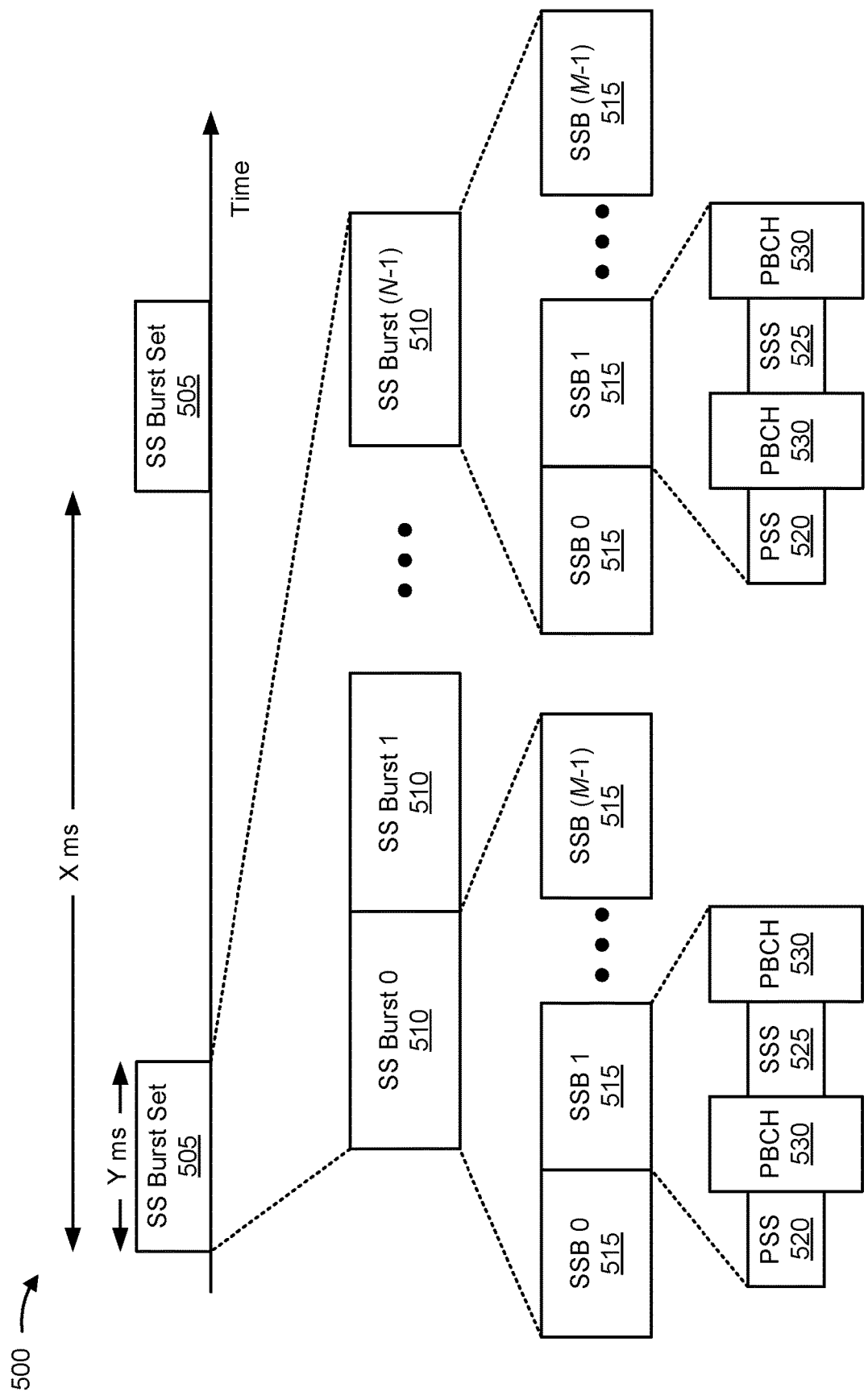
FIG. 5 is a diagram illustrating an example of a synchronization signal (SS) hierarchy, in accordance with the present disclosure.

FIG. 5 is a diagram illustrating an example 500 of an SS hierarchy, in accordance with the present disclosure. As shown in FIG. 5, the SS hierarchy may include an SS burst set 505, which may include multiple SS bursts 510, shown as SS burst 0 through SS burst N−1, where N is a maximum number of repetitions of the SS burst 510 that may be transmitted by the base station. As further shown, each SS burst 510 may include one or more SSBs 515, shown as SSB 0 through SSB M−1, where M is a maximum number of SSBs 515 that can be carried by an SS burst 510. In some aspects, different SSBs 515 may be beam-formed differently (e.g., transmitted using different beams), and may be used for cell search, cell acquisition, beam management, and/or beam selection (e.g., as part of an initial network access procedure). An SS burst set 505 may be periodically transmitted by a wireless node (e.g., base station 110), such as every X ms, as shown in FIG. 5. In some aspects, an SS burst set 505 may have a fixed or dynamic length, shown as Y ms in FIG. 5. In some cases, an SS burst set 505 or an SS burst 510 may be referred to as a discovery reference signal (DRS) transmission window or an SSB measurement time configuration (SMTC) window.

In some aspects, an SSB 515 may include resources that carry a PSS 520, an SSS 525, and/or a physical broadcast channel (PBCH) 530. In some aspects, multiple SSBs 515 are included in an SS burst 510 (e.g., with transmission on different beams), and the PSS 520, the SSS 525, and/or the PBCH 530 may be the same across each SSB 515 of the SS burst 510. In some aspects, a single SSB 515 may be included in an SS burst 510. In some aspects, the SSB 515 may be at least four symbols (e.g., OFDM symbols) in length, where each symbol carries one or more of the PSS 520 (e.g., occupying one symbol), the SSS 525 (e.g., occupying one symbol), and/or the PBCH 530 (e.g., occupying two symbols). In some aspects, an SSB 515 may be referred to as an SS/PBCH block.

In some aspects, the symbols of an SSB 515 are consecutive, as shown in FIG. 5. Similarly, in some aspects, one or more SSBs 515 of the SS burst 510 may be transmitted in consecutive radio resources (e.g., consecutive symbols) during one or more slots. Additionally, or alternatively, one or more SSBs 515 of the SS burst 510 may be transmitted in non-consecutive radio resources.

In some aspects, the SS bursts 510 may have a burst period, and the SSBs 515 of the SS burst 510 may be transmitted by a wireless node (e.g., base station 110) according to the burst period. In this case, the SSBs 515 may be repeated during each SS burst 510. In some aspects, the SS burst set 505 may have a burst set periodicity (SSB periodicity), whereby the SS bursts 510 of the SS burst set 505 are transmitted by the wireless node according to the fixed burst set periodicity (e.g., every 20 ms, 40 ms, 80 ms, or 160 ms, among other examples). In other words, the SS bursts 510 may be repeated during each SS burst set 505. In some aspects, the SS burst set 505 may include only one SS burst 510.

In some aspects, an SSB 515 may include an SSB index, which may correspond to a beam used to carry the SSB 515. A UE 120 may monitor for and/or measure SSBs 515 using different receive (Rx) beams during an initial network access procedure and/or a cell search procedure, among other examples. Based at least in part on the monitoring and/or measuring, the UE 120 may indicate one or more SSBs 515 with a best signal parameter (e.g., an RSRP parameter) to a base station 110. The base station 110 and the UE 120 may use the one or more indicated SSBs 515 to select one or more beams to be used for communication between the base station 110 and the UE 120 (e.g., for a random access channel (RACH) procedure). Additionally, or alternatively, the UE 120 may use the SSB 515 and/or the SSB index to determine a cell timing for a cell via which the SSB 515 is received (e.g., a serving cell).

As indicated above, FIG. 5 is provided as an example. Other examples may differ from what is described with regard to FIG. 5.

Figure 6:
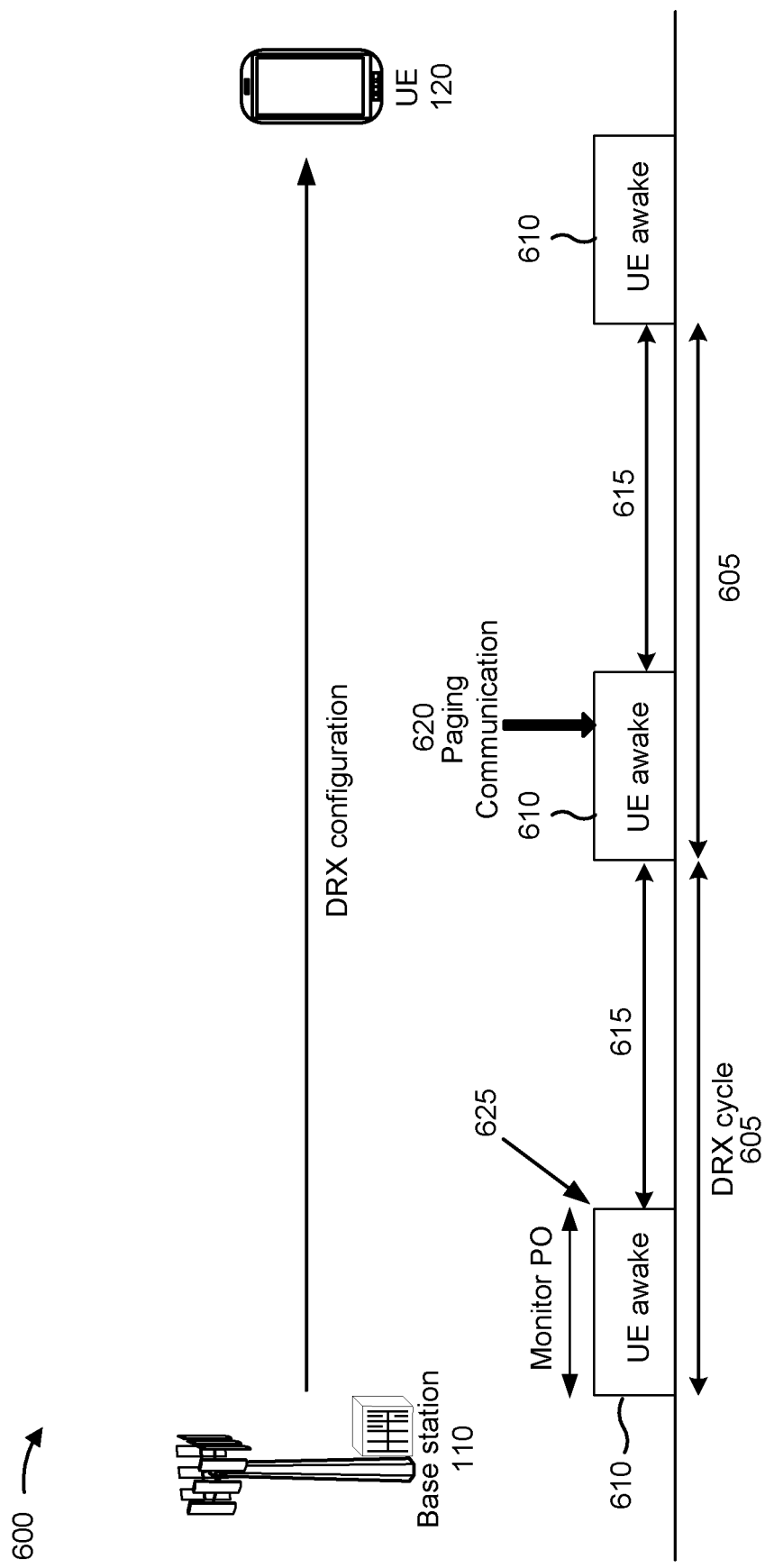
FIG. 6 is a diagram illustrating an example of a discontinuous reception (DRX) configuration, in accordance with the present disclosure.

FIG. 6 is a diagram illustrating an example 600 of a DRX configuration, in accordance with the present disclosure.

As shown in FIG. 6, a base station 110 may transmit a DRX configuration (e.g., in a system information block (SIB)) to a UE 120 to configure a DRX cycle 605 for the UE 120. A DRX cycle 605 may include a UE awake time 610 (e.g., during which a UE 120 is awake or in an active state to monitor POs) and an opportunity to enter a DRX sleep state 615. As used herein, the time during which the UE 120 is configured to be in an active state during the UE awake time 610 may be referred to as an active time, and the time during which the UE 120 is configured to be in the DRX sleep state 615 may be referred to as an inactive time. As described below, the UE 120 may monitor a physical downlink control channel (PDCCH) during the active time, and the UE 120 may refrain from monitoring the PDCCH during the inactive time.

During the UE awake time 610 (e.g., the active time), the UE 120 may monitor a downlink control channel (e.g., a PDCCH) for a paging communication 620. In some aspects, the UE awake time 610 may correspond to periodic POs (e.g., as determined by the AMF and described further herein). For example, the UE 120 may monitor the PDCCH for a paging communication (e.g., encrypted by a paging radio network temporary identifier (P-RNTI)) pertaining to the UE 120 during POs. If the UE 120 does not detect and/or successfully decode any PDCCH communications intended for the UE 120 during the UE awake time 610, then the UE 120 may enter the sleep state 615 (e.g., for the inactive time) at the end of the UE awake time 610. In this way, the UE 120 may conserve battery power and reduce power consumption. As shown, the DRX cycle 605 may repeat with a configured periodicity according to the DRX configuration.

As indicated above, FIG. 6 is provided as an example. Other examples may differ from what is described with respect to FIG. 6.

FIG. 7 is a diagram illustrating an example 700 of SSB transmission frames and POs, in accordance with the present disclosure. As shown in FIG. 7, while some POs may be aligned with SSB transmissions (e.g., received by the UE at a same frame) some POs may not be aligned with SSB transmissions.

For example, in example 700, the SSB periodicity is 20 ms, indicating that an SSB is transmitted to a UE (e.g., UE 120) by a base station (e.g., base station 110) every other frame (e.g., at even frames, such as frames 0, 2, 4, and 6). As shown by reference number 710, in a situation where the UE is configured with a 0 PF_offset, a DRX cycle of 32 frames, 32 PFs per DRX cycle (e.g., "oneT" DRX configuration indicating one PF for each frame of a DRX cycle, indicating N=32), and an even UE_ID (e.g., S-TMSI), the PO for the UE may occur in an even frame (e.g., frame 2 when UE_ID mod N=2, frame 4 when UE_ID mod N=4, and so on). When the PO for a UE occurs in an even frame in example 700, the PO is aligned with the frames in which an SSB is transmitted. As shown by reference number 720, in a situation where the UE is configured in the foregoing manner, except with an odd UE_ID (e.g., S-TMSI), the PO for the UE may occur in an odd frame (e.g., frame 1 when UE_ID mod N=1, frame 3 when UE_ID mod N=3, and so on). When the PO for a UE occurs in an odd frame in example 700, the PO is not aligned with the frames in which an SSB is transmitted.

In situations where SSBs are not aligned with POs (e.g., as shown by reference number 720), a UE may not receive paging communications and SSB communications in the same UE awake time (e.g., active time monitoring for a paging communication), and a UE may require additional activations (e.g., additional or extended UE awake times, or wake-ups from an RRC idle mode) to receive SSB communications. This may reduce power and/or battery life relative to UEs that have SSB communications aligned with POs, which may need to wake up multiple times within a paging cycle (e.g., once for a PO, and again for SSB reception).

Some techniques and apparatuses described herein enable alignment of POs and SSB communications to improve UE power and battery efficiency. For example, an AMF may assign a UE with an identifier (e.g., an S-TMSI) that, based at least in part on an SSB periodicity and number of PFs per DRX cycle, would result in the UE's POs being aligned with SSB communications. As another example, when forwarding a UE identifier (e.g., S-TMSI) to a UE, a base station may transmit an identifier adjustment value based at least in part on the SSB periodicity and number of PFs per DRX cycle, such that the UE, when using the identifier adjustment value with the UE identifier, will be configured with POs that are aligned with SSB communications. In this way, a UE may be able to receive paging communications and SSB transmissions in the same UE awake time, enabling the UE to conserve resources, such as power or battery resources, relative to UEs that do not have paging communications aligned with SSB communications. In addition, different types of UEs may be configured with different identifiers, enabling a network operator to provide power saving configurations to UEs based on UE type.

As indicated above, FIG. 7 is provided as an example. Other examples may differ from what is described with respect to FIG. 7.

Figure 8:
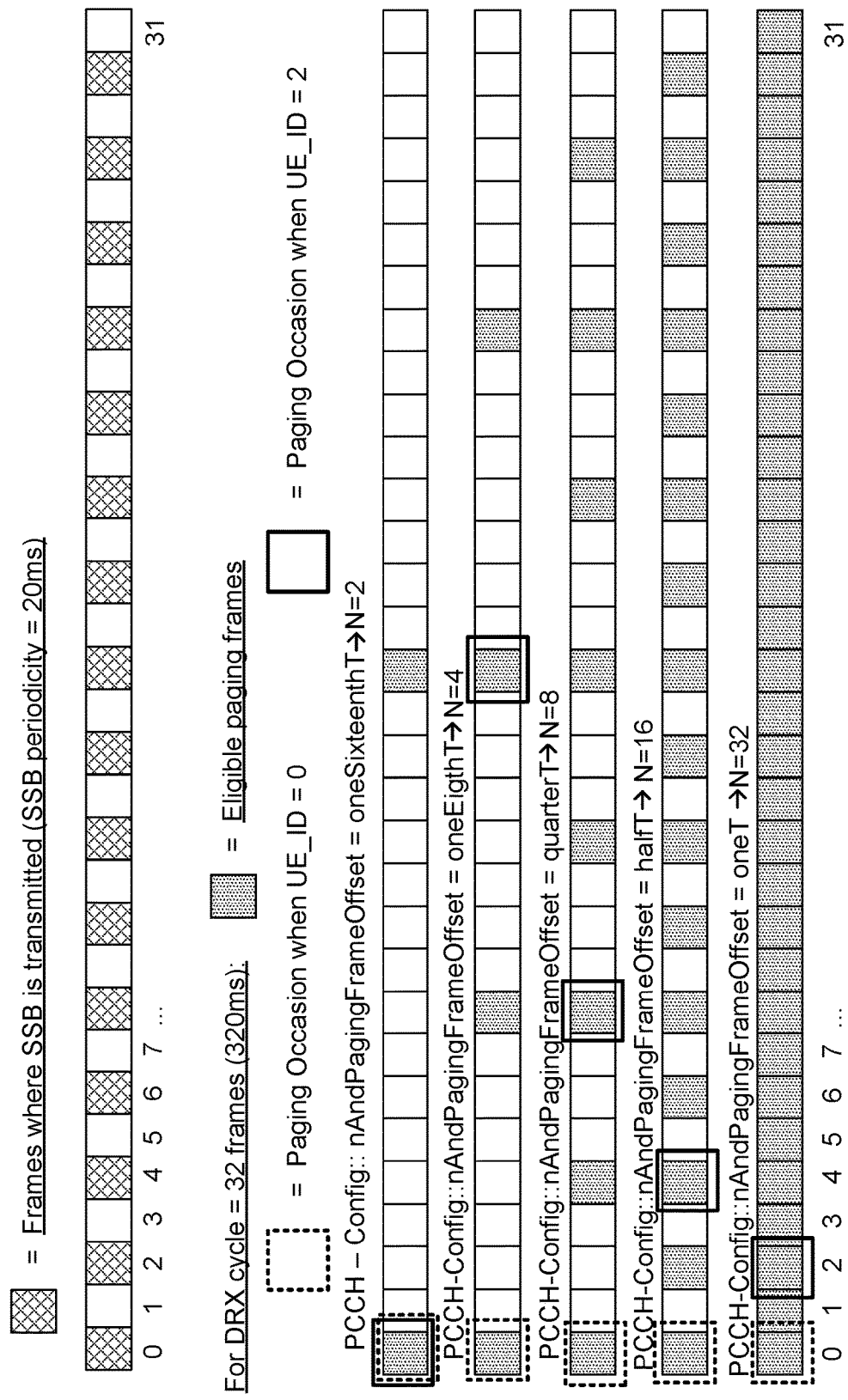
FIG. 8 is a diagram illustrating an example associated with aligning POs and SSB communications, in accordance with the present disclosure.

FIG. 8 is a diagram illustrating an example 800 associated with aligning POs and SSB communications, in accordance with the present disclosure. As shown in FIG. 8, an AMF (e.g., AMF 340) or base station (e.g., base station 110) may align POs with SSB communications for a UE by enabling the UE to use an even value for the UE_ID (e.g., S-TMSI) when calculating POs and PFs (e.g., given SSB periodicity that results in SSB communications in even frames).

For example, in example 800, the SSB periodicity is 20 ms, indicating that an SSB is transmitted to a UE (e.g., UE 120) by a base station (e.g., base station 110) every other frame (e.g., at even frames, such as frames 0, 2, 4, and 6). Given the foregoing, the AMF may determine to assign even S-TMSIs to UEs that are to have POs and SSB communications aligned. Alternatively, the base station may provide the UE with an identifier adjustment value that, when summed with the UE's S-TMSI, results in an even value to be used for PO determination, as described herein.

In some aspects, as shown in example 800, when N=2 (e.g., indicating two PFs per DRX cycle), performing a modulo operation on an example UE_ID of 0 results in a remainder of 0, indicating the UE would use the first PF of the DRX cycle (e.g., frame number 0) as the PO, which would be aligned with an SSB communication received at frame number 0. Performing the modulo operation on an example UE_ID of 2 also results in a remainder of 0, indicating the same PF and PO for UEs associated with UE_ID 0 and UE_ID 2.

In some aspects, as shown in example 800, when N=4 (e.g., indicating four PFs per DRX cycle), performing a modulo operation on an example UE_ID of 0 results in a remainder of 0, indicating the UE would use the first PF of the DRX cycle (e.g., frame number 0) as the PO, which would be aligned with an SSB communication received at frame number 0. Performing the modulo operation on an example UE_ID of 2 results in a remainder of 2, indicating the third PF of the DRX cycle (e.g., frame number 16, PF index of 2) as the PO for the UE associated with UE_ID 2, which is aligned with the SSB communication received at frame number 16.

In some aspects, as shown in example 800, when N=8 (e.g., indicating eight PFs per DRX cycle), performing a modulo operation on an example UE_ID of 0 results in a remainder of 0, indicating the UE would use the first PF of the DRX cycle (e.g., frame number 0) as the PO, which would be aligned with an SSB communication received at frame number 0. Performing the modulo operation on an example UE_ID of 2 results in a remainder of 2, indicating the third PF of the DRX cycle (e.g., frame number 8, PF index of 2) as the PO for the UE associated with UE_ID 2, which is aligned with the SSB communication received at frame number 8.

In some aspects, as shown in example 800, when N=16 (e.g., indicating 16 PFs per DRX cycle), performing a modulo operation on an example UE_ID of 0 results in a remainder of 0, indicating the UE would use the first PF of the DRX cycle (e.g., frame number 0) as the PO, which would be aligned with an SSB communication received at frame number 0. Performing the modulo operation on an example UE_ID of 2 results in a remainder of 2, indicating the third PF of the DRX cycle (e.g., frame number 4, PF index of 2) as the PO for the UE associated with UE_ID 2, which is aligned with the SSB communication received at frame number 4.

In some aspects, as shown in example 800, when N=32 (e.g., indicating 32 PFs per DRX cycle), performing a modulo operation on an example UE_ID of 0 results in a remainder of 0, indicating the UE would use the first PF of the DRX cycle (e.g., frame number 0) as the PO, which would be aligned with an SSB communication received at frame number 0. Performing the modulo operation on an example UE_ID of 2 results in a remainder of 2, indicating the third PF of the DRX cycle (e.g., frame number 2, PF index of 2) as the PO for the UE associated with UE_ID 2, which is aligned with the SSB communication received at frame number 2.

While FIG. 8 depicts various paging and SSB configurations where the UE_IDs are 0 and 2, respectively, some configurations will work with all UE_IDs, including odd UE_IDs. For example, when N=16, performing a modulo operation on an example UE_ID of 1 results in a remainder of 1, indicating the UE would use the second PF of the DRX cycle (e.g., frame number 2), which is aligned with an SSB communication. However, while reducing N (e.g., the number of PFs per DRX cycle) may facilitate alignment of POs and SSB communications, using N=32 will increase the resources available for paging (e.g., enabling all 32 frames to be used for paging, as described herein).

As indicated above, FIG. 8 is provided as an example. Other examples may differ from what is described with respect to FIG. 8. For example, in a situation where SSB periodicity is 40 ms, SSBs are transmitted every four frames (e.g., at frame 0, 4, 8, 12, 16, and so on). In this situation, a UE_ID of 2 will not be aligned when N=32, as there is no longer an SSB transmitted at frame 2. Accordingly, the UE will need to use a value (e.g., UE_ID or UE_ID plus identifier adjustment value) that is evenly divisible by 4 (e.g., 4, 8, 12, 16, etc.) in order to align POs of the UE with SSB communications.

Figure 9:
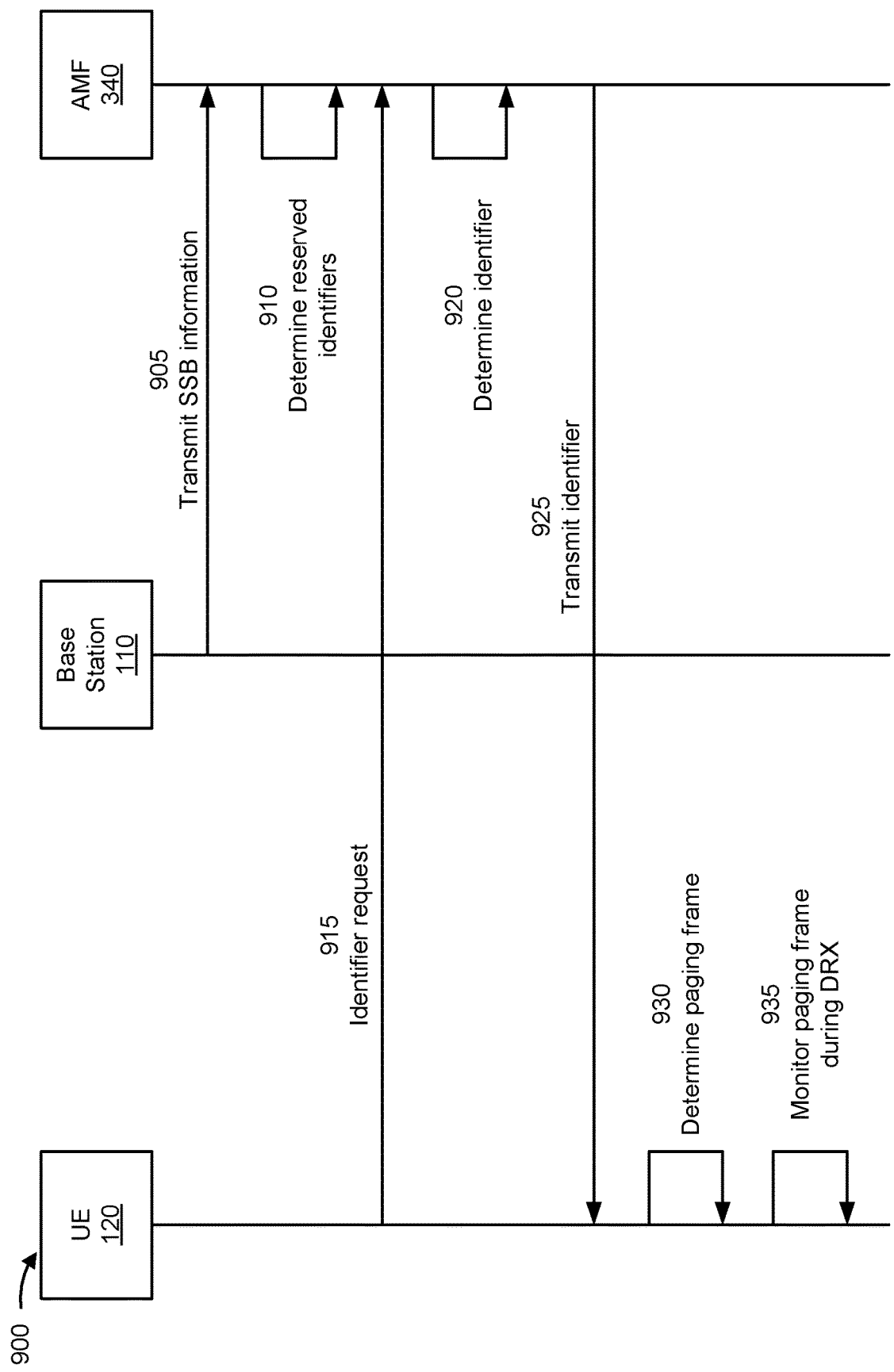
FIG. 9 is a diagram illustrating an example associated with aligning POs and SSB communications by an access and mobility management function (AMF), in accordance with the present disclosure.

FIG. 9 is a diagram illustrating an example 900 associated with aligning POs and SSB communications by an AMF, in accordance with the present disclosure. As shown in FIG. 9, a UE (e.g., UE 120) may communicate (e.g., transmit an uplink transmission and/or receive a downlink transmission) with an AMF (e.g., AMF 340) and/or a base station (e.g., base station 110). In some aspects, the UE may communicate with the AMF via the base station. The UE, the base station, and the AMF may be part of a wireless network (e.g., wireless network 100).

As shown by reference number 905, the base station may transmit, and the AMF may receive, information indicating an SSB periodicity. In some aspects, the AMF may receive the SSB information from another device (e.g., from another base station or device of the wireless network). In some aspects, the SSB information may be received via an NG interface. In some aspects, the SSB periodicity may be 20 ms, 40 ms, 80 ms, 160 ms, and/or the like. In some aspects, the AMF may obtain (e.g., from the base station or another source within the wireless network) information indicating an SSB starting offset (e.g., indicating which half of a frame includes an SSB). Additionally, or alternatively, the base station may transmit, and the AMF may receive, information indicating a number of PFs per DRX cycle associated with the wireless network, the base station, and/or the UE.

As shown by reference number 910, the AMF may determine a set of reserved identifiers. The AMF may determine the set of reserved identifiers based at least in part on the SSB periodicity and the number of PFs per DRX cycle. In some aspects, the AMF may determine, as the set of reserved identifiers, potential identifiers that, when divided by the number of PFs per DRX cycle, have a remainder that, when expressed in units of frames within the DRX cycle and divided by the SSB periodicity in frames (e.g., 20 ms=2 frames), has a particular remainder (e.g., a remainder of zero). In some aspects, the particular remainder may be based at least in part on an SSB starting offset and/or a PF offset. For example, in a situation where the PF offset and SSB starting offset are the same value in units of frames, a zero remainder would ensure alignment in the foregoing formula. When the PF offset and SSB starting offset are different, a non-zero remainder may be used (e.g., to ensure the difference between the PF offset and SSB starting offset is accounted for).

In some aspects, the set of reserved identifiers may be reserved for UEs of a particular type, such as reduced capability (RedCap) devices, smartwatches, IoT devices, and/or other devices that might have reduce capacity or capabilities, such as reduced battery life and/or battery capacity. By reserving identifiers for the particular type of UE, the network may create priority pools of identifiers for UEs that may benefit from alignment of POs and SSB communications, relative to identifiers in non-priority pools of identifiers for UEs that may not benefit as much from alignment of POs and SSB communications (e.g., UEs with a constant power source, high battery capacity, and/or the like).

As shown by reference number 915, the UE may transmit, and the AMF may receive, a communication associated with a request for an identifier. In some aspects, the communication may be an RRC setup request. For example, the communication may be included as part of a RACH procedure to provide the UE with access to the wireless network.

As shown by reference number 920, the AMF may determine the identifier. The identifier may be determined based at least in part on the SSB periodicity and the number of PFs per DRX cycle. In some aspects, the AMF may determine, as the identifier, a value that aligns SSB transmission frames with PFs associated with the value as the identifier, as described herein.

In some aspects, the identifier is based on whether the UE is of a first type or a second type (e.g., a priority UE or non-priority UE). For example, when the type of the UE is the first type (e.g., a priority UE), the identifier may be a first number that, when divided by the number of PFs per DRX cycle (e.g., N), has a first remainder that, when expressed in frames within the DRX cycle and divided by the SSB periodicity in frames, has a remainder of zero. As another example, when the type of the UE is the second type (e.g., a non-priority UE), the identifier may be a second number that, when divided by the number of PFs per DRX cycle (e.g., N), has a second remainder that, when expressed in frames within the DRX cycle and divided by the SSB periodicity in frames, has a non-zero remainder.

As described herein, in some aspects, the identifier may be based at least in part on the type of the UE. For example, RedCap devices, devices that support a particular $3^{rd}$ Generation Partnership Project (3GPP) release, devices associated with a type of UE indicative of a reduced measure of battery life, and/or the like, may be assigned identifiers that align POs with SSBs. In this situation, UEs of a different type (e.g., non-priority UEs) may not receive a reserved identifier.

As shown by reference number 925, the AMF may transmit, and the UE may receive, the identifier. The identifier may be transmitted to the UE via the base station. In some aspects, the identifier may be transmitted as part of a RACH process involving the UE, the base station, and the AMF.

As shown by reference number 925, the UE may determine a PF. In some aspects, the UE may determine the PF based at least in part on the number of frames per DRX cycle, a number of PFs per DRX cycle, and the identifier (e.g., as described herein). The PF may be, for example, the PF to be monitored during DRX (e.g., a PO).

As shown by reference number 930, the UE may monitor the PF during DRX. In some aspects, the system frame number of the PF to be monitored is based at least in part on the identifier (e.g., as described herein). For example, when the UE transitions from a DRX sleep state to a UE awake time, the UE may monitor a PDCCH associated with the PF for paging communications from the AMF, the base station, and/or another device. In some aspect, as described herein, UE may also receive SSB communications during the PF.

As indicated above, FIG. 9 is provided as an example. Other examples may differ from what is described with regard to FIG. 9.

Figure 10:
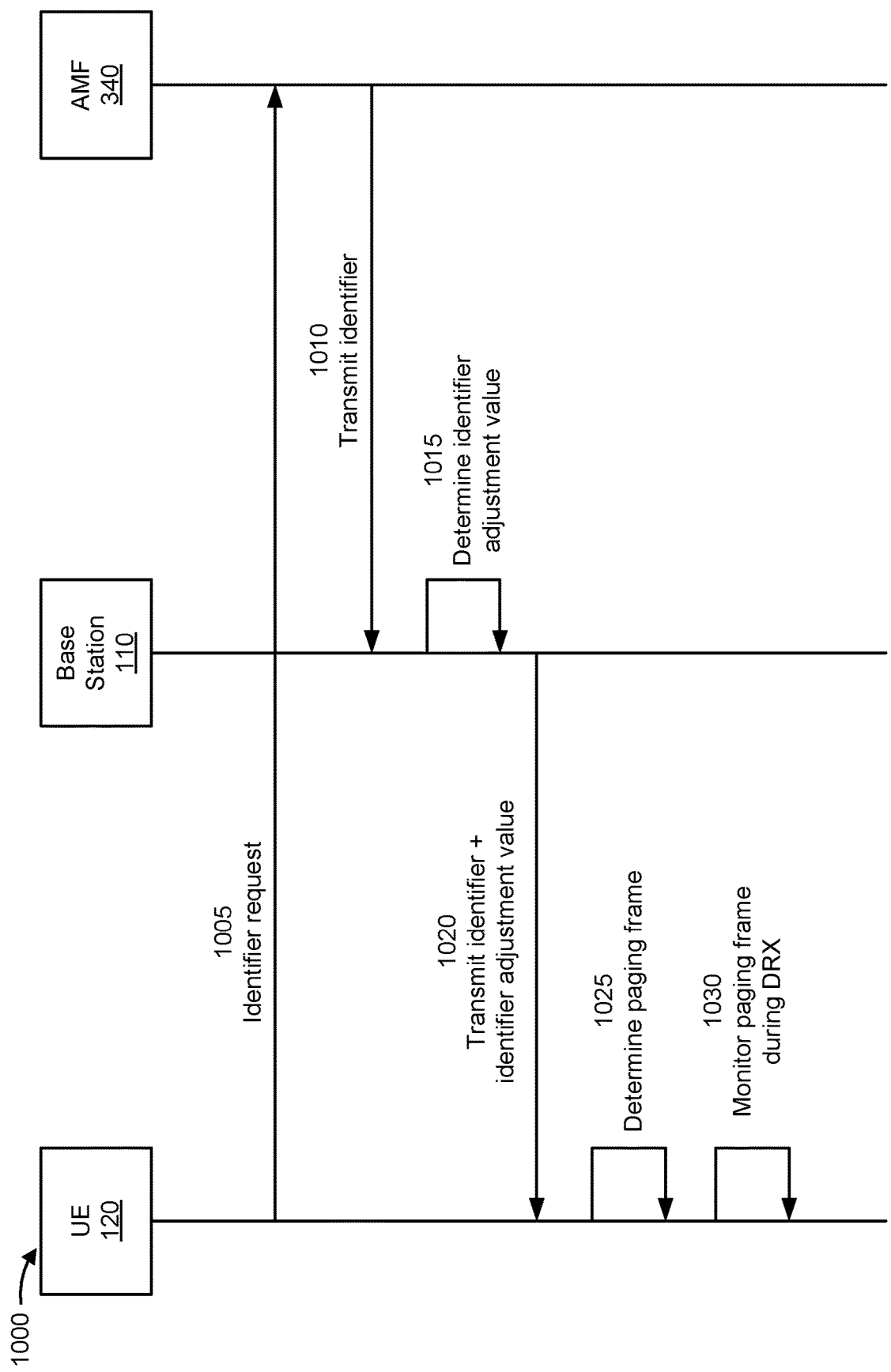
FIG. 10 is a diagram illustrating an example associated with aligning POs and SSB communications by a base station, in accordance with the present disclosure.

FIG. 10 is a diagram illustrating an example 1000 associated with aligning POs and SSB communications by a base station, in accordance with the present disclosure. As shown in FIG. 10, a UE (e.g., UE 120) may communicate (e.g., transmit an uplink transmission and/or receive a downlink transmission) with an AMF (e.g., AMF 340) and/or a base station (e.g., base station 110). In some aspects, the UE may communicate with the AMF via the base station. The UE, the base station, and the AMF may be part of a wireless network (e.g., wireless network 100).

As shown by reference number 1005, the UE may transmit, and the AMF may receive, a communication associated with a request for an identifier. In some aspects, the communication may be an RRC setup request. For example, the communication may be included as part of a RACH procedure to provide the UE with access to the wireless network.

As shown by reference number 1010, the AMF may transmit, and the base station may receive, the identifier. The identifier may be transmitted to the base station for relaying to the UE. In some aspects, the identifier may be transmitted as part of a RACH process involving the UE, the base station, and the AMF.

As shown by reference number 1015, the base station may determine an identifier adjustment value. The identifier adjustment value may be determined based at least in part on the SSB periodicity and the number of PFs per DRX cycle. In some aspects, the base station may determine, as the identifier adjustment value, a value that aligns SSB transmission frames with PFs associated with the value as the identifier adjustment value. In some aspects, the base station may determine an identifier adjustment value that, when added to the identifier, would achieve the alignment of SSB transmission frames and PFs, as described herein. For example, in a situation where UEs with even identifiers (e.g., even numbered S-TMSIs) would have SSB transmission frames aligned with PFs, the base station may determine an identifier adjustment value of 1, for an odd-numbered identifier, to cause the UE to add the adjustment value to the odd-numbered identifier, resulting in an even number to be used when the UE determines POs and PFs. For example, the UE may be configured (e.g., by the base station) to add the identifier adjustment value to the UE_ID of the original equation, resulting in the following equation:

$$(\text{SFN} + PF\_\text{offset}) \bmod T = (T \text{ div } N) * ((UE\_\text{ID} + UE\_\text{adj}) \bmod N)$$

where UE_adj is the identifier adjustment value.

In some aspects, the base station may determine the identifier adjustment value based at least in part on whether the UE is of a first type or a second type (e.g., a priority UE or non-priority UE), in a manner similar to the AMF determining the identifier, as described herein.

As shown by reference number 1020, the base station may transmit, and the UE may receive, the identifier and the identifier adjustment value. In some aspects, the identifier and identifier adjustment value may be transmitted as part of a RACH process involving the UE, the base station, and the AMF.

As shown by reference number 1025, the UE may determine a PF. In some aspects, the UE may determine the PF based at least in part on the number of frames per DRX cycle, a number of PFs per DRX cycle, the identifier, and the identifier adjustment value (e.g., as described herein). The PF may be, for example, the PF to be monitored during DRX (e.g., a PO).

As shown by reference number 1030, the UE may monitor the PF during DRX. In some aspects, the system frame number of the PF to be monitored is based at least in part on the identifier and the identifier adjustment value (e.g., as described herein). For example, when the UE transitions from a DRX sleep state to a UE awake time, the UE may monitor a PDCCH associated with the PF for paging communications from the AMF, the base station, and/or another device. In some aspect, as described herein, UE may also receive SSB communications during the PF.

As indicated above, FIG. 10 is provided as an example. Other examples may differ from what is described with regard to FIG. 10.

Figure 11:
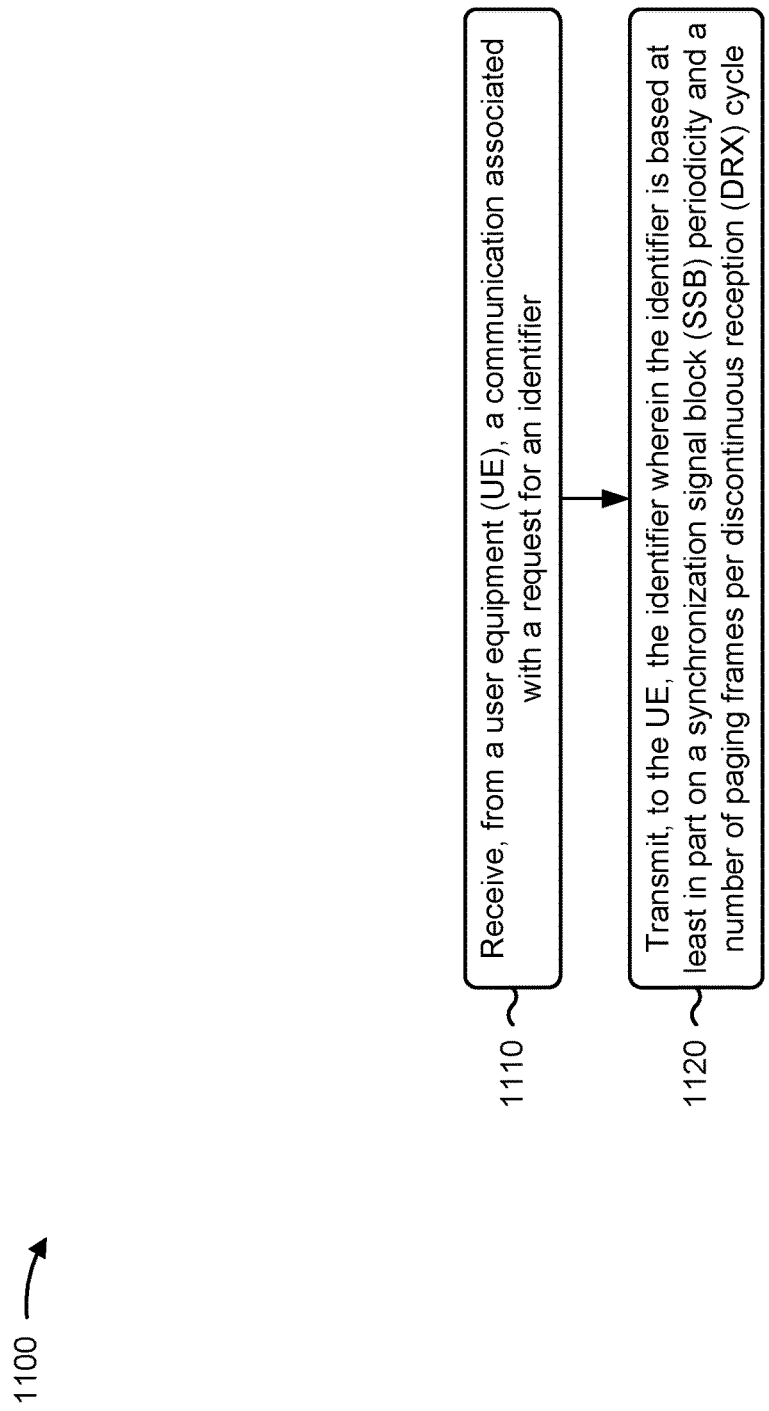
FIGS. 11-13 are diagrams illustrating example processes associated with aligning POs and SSBs, in accordance with the present disclosure.

FIG. 11 is a diagram illustrating an example process 1100 performed, for example, by an AMF, in accordance with the present disclosure. Example process 1100 is an example where the AMF (e.g., AMF 340) performs operations associated with aligning POs and synchronization signal blocks.

As shown in FIG. 11, in some aspects, process 1100 may include receiving, from a UE, a communication associated with a request for an identifier (block 1110). For example, the AMF (e.g., using communication manager 345 and/or reception component 1402, depicted in FIG. 14) may receive, from a UE, a communication associated with a request for an identifier, as described above.

As further shown in FIG. 11, in some aspects, process 1100 may include transmitting, to the UE, the identifier, wherein the identifier is based at least in part on a SSB periodicity and a number of PFs per DRX cycle (block 1120). For example, the AMF (e.g., using communication manager 345 and/or transmission component 1404, depicted in FIG. 14) may transmit, to the UE, the identifier, wherein the identifier is based at least in part on an SSB periodicity and a number of PFs per DRX cycle, as described above. In some aspects, the identifier is based at least in part on a SSB periodicity and a number of PFs per DRX cycle.

Process 1100 may include additional aspects, such as any single aspect or any combination of aspects described below and/or in connection with one or more other processes described elsewhere herein.

In a first aspect, process 1100 includes determining, based at least in part on the SSB periodicity and the number of PFs per DRX cycle, the identifier.

In a second aspect, alone or in combination with the first aspect, determining the identifier comprises determining, as the identifier, a value that aligns SSB transmission frames with PFs associated with the value as the identifier.

In a third aspect, alone or in combination with one or more of the first and second aspects, process 1100 includes determining, based at least in part on the SSB periodicity and the number of PFs per DRX cycle, a set of reserved identifiers, and the set of reserved identifiers being reserved for UEs of a first type.

In a fourth aspect, alone or in combination with one or more of the first through third aspects, determining the set of reserved identifiers comprises determining, as the set of reserved identifiers, potential identifiers that, when divided by the number of PFs per DRX cycle, have a remainder that, when expressed in frames within the DRX cycle and divided by the SSB periodicity in frames, has a remainder of zero.

In a fifth aspect, alone or in combination with one or more of the first through fourth aspects, process 1100 includes receiving, from a base station, information indicating the SSB periodicity.

In a sixth aspect, alone or in combination with one or more of the first through fifth aspects, the identifier is further based on a type of the UE being one of a first type or a second type, wherein, when the type of the UE is the first type, the identifier is a first number that, when divided by the number of PFs per DRX cycle, has a first remainder that, when expressed in frames within the DRX cycle and divided by the SSB periodicity in frames, has a remainder of zero, and wherein, when the type of the UE is the second type, the identifier is a second number that, when divided by the number of PFs per DRX cycle, has a second remainder that, when expressed in frames within the DRX cycle and divided by the SSB periodicity in frames, has a non-zero remainder.

In a seventh aspect, alone or in combination with one or more of the first through sixth aspects, the identifier is further based on a type of the UE comprising a RedCap type.

In an eighth aspect, alone or in combination with one or more of the first through seventh aspects, the identifier is further based on a type of the UE comprising a UE type that supports a particular 3GPP release.

In a ninth aspect, alone or in combination with one or more of the first through eighth aspects, the identifier is further based on a type of the UE indicating a measure of battery life associated with the UE.

In a tenth aspect, alone or in combination with one or more of the first through ninth aspects, the identifier is further based on an SSB starting offset and a PF offset.

In an eleventh aspect, alone or in combination with one or more of the first through tenth aspects, the device is an AMF device.

In a twelfth aspect, alone or in combination with one or more of the first through eleventh aspects, the communication is an RRC setup request.

In a thirteenth aspect, alone or in combination with one or more of the first through twelfth aspects, the identifier is an S-TMSI.

Although FIG. 11 shows example blocks of process 1100, in some aspects, process 1100 may include additional blocks, fewer blocks, different blocks, or differently arranged blocks than those depicted in FIG. 11. Additionally, or alternatively, two or more of the blocks of process 1100 may be performed in parallel.

Figure 12:
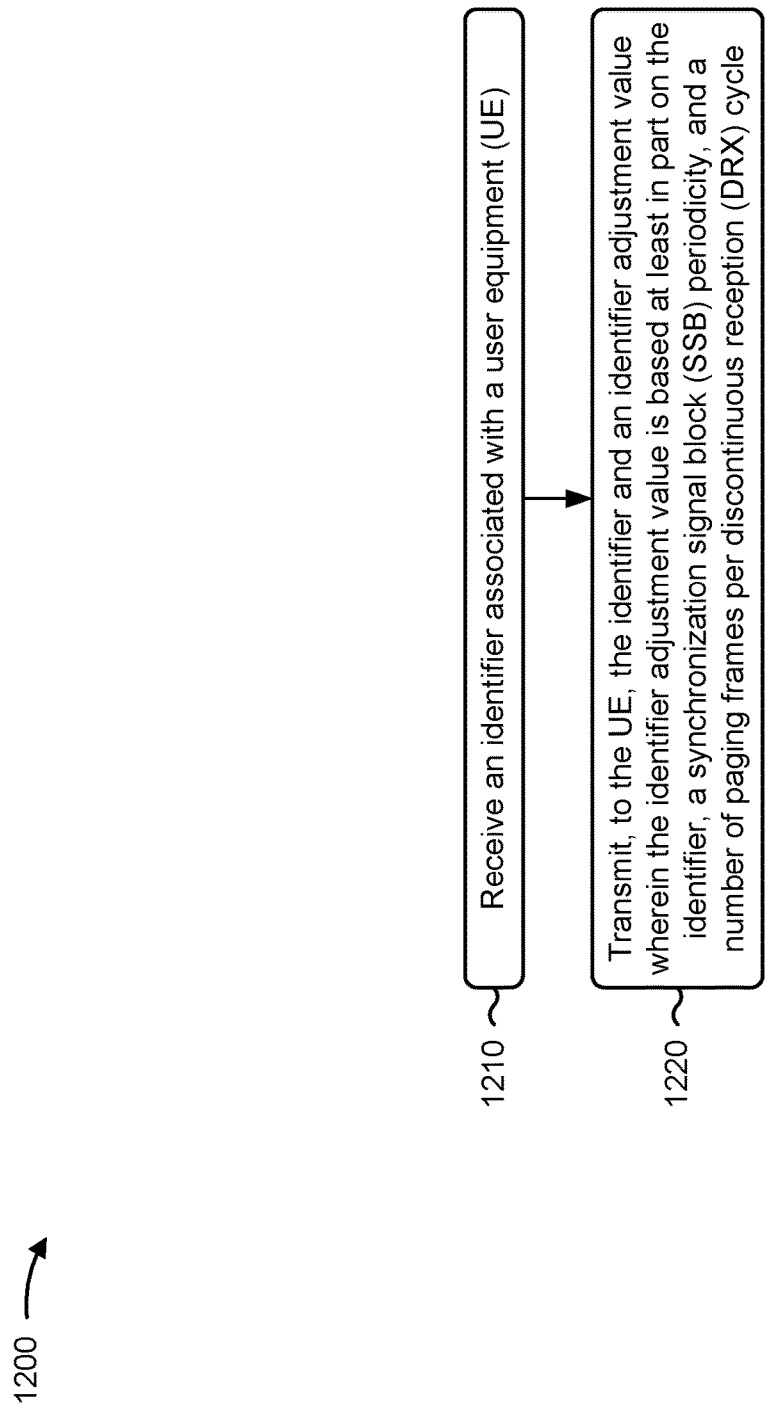

FIG. 12 is a diagram illustrating an example process 1200 performed, for example, by a base station, in accordance with the present disclosure. Example process 1200 is an example where the base station (e.g., base station 110) performs operations associated with aligning POs and synchronization signal blocks.

As shown in FIG. 12, in some aspects, process 1200 may include receiving an identifier associated with a UE (block 1210). For example, the base station (e.g., using communication manager 150 and/or reception component 1502, depicted in FIG. 15) may receive an identifier associated with a UE, as described above.

As further shown in FIG. 12, in some aspects, process 1200 may include transmitting, to the UE, the identifier and an identifier adjustment value, wherein the identifier adjustment value is based at least in part on the identifier, a SSB periodicity, and a number of PFs per DRX cycle (block 1220). For example, the base station (e.g., using communication manager 150 and/or transmission component 1504, depicted in FIG. 15) may transmit, to the UE, the identifier and an identifier adjustment value, wherein the identifier adjustment value is based at least in part on the identifier, a SSB periodicity, and a number of PFs per DRX cycle, as described above. In some aspects, the identifier adjustment value is based at least in part on the identifier, a SSB periodicity, and a number of PFs per DRX cycle.

Process 1200 may include additional aspects, such as any single aspect or any combination of aspects described below and/or in connection with one or more other processes described elsewhere herein.

In a first aspect, process 1200 includes determining, based at least in part on the SSB periodicity and the number of PFs per DRX cycle, the identifier adjustment value.

In a second aspect, alone or in combination with the first aspect, determining the identifier adjustment value comprises determining, as the identifier adjustment value, a value that aligns SSB transmission frames with PFs associated with the value as the identifier adjustment value.

In a third aspect, alone or in combination with one or more of the first and second aspects, determining the identifier adjustment value comprises determining, as the identifier adjustment value, a value that, when summed with the identifier and divided by the number of PFs per DRX cycle, has a remainder that aligns SSB transmission frames with PFs of the UE.

In a fourth aspect, alone or in combination with one or more of the first through third aspects, the identifier adjustment value is further based on a type of the UE being one of a first type or a second type, wherein, when the type of the UE is the first type, the identifier is a first number that, when divided by the number of PFs per DRX cycle, has a first remainder that, when expressed in frames within the DRX cycle and divided by the SSB periodicity in frames, has a remainder of zero, and wherein, when the type of the UE is the second type, the identifier is a second number that, when divided by the number of PFs per DRX cycle, has a second remainder that, when expressed in frames within the DRX cycle and divided by the SSB periodicity in frames, has a non-zero remainder.

In a fifth aspect, alone or in combination with one or more of the first through fourth aspects, the identifier adjustment value is further based on a type of the UE comprising a RedCap type.

In a sixth aspect, alone or in combination with one or more of the first through fifth aspects, the identifier adjustment value is further based on a type of the UE comprising a UE type that supports a particular 3GPP release.

In a seventh aspect, alone or in combination with one or more of the first through sixth aspects, the identifier adjustment value is further based on a type of the UE indicating a measure of battery life associated with the UE.

In an eighth aspect, alone or in combination with one or more of the first through seventh aspects, the identifier adjustment value is further based on an SSB starting offset and a PF offset.

In a ninth aspect, alone or in combination with one or more of the first through eighth aspects, the identifier is a S-TMSI.

Although FIG. 12 shows example blocks of process 1200, in some aspects, process 1200 may include additional blocks, fewer blocks, different blocks, or differently arranged blocks than those depicted in FIG. 12. Additionally, or alternatively, two or more of the blocks of process 1200 may be performed in parallel.

Figure 13:
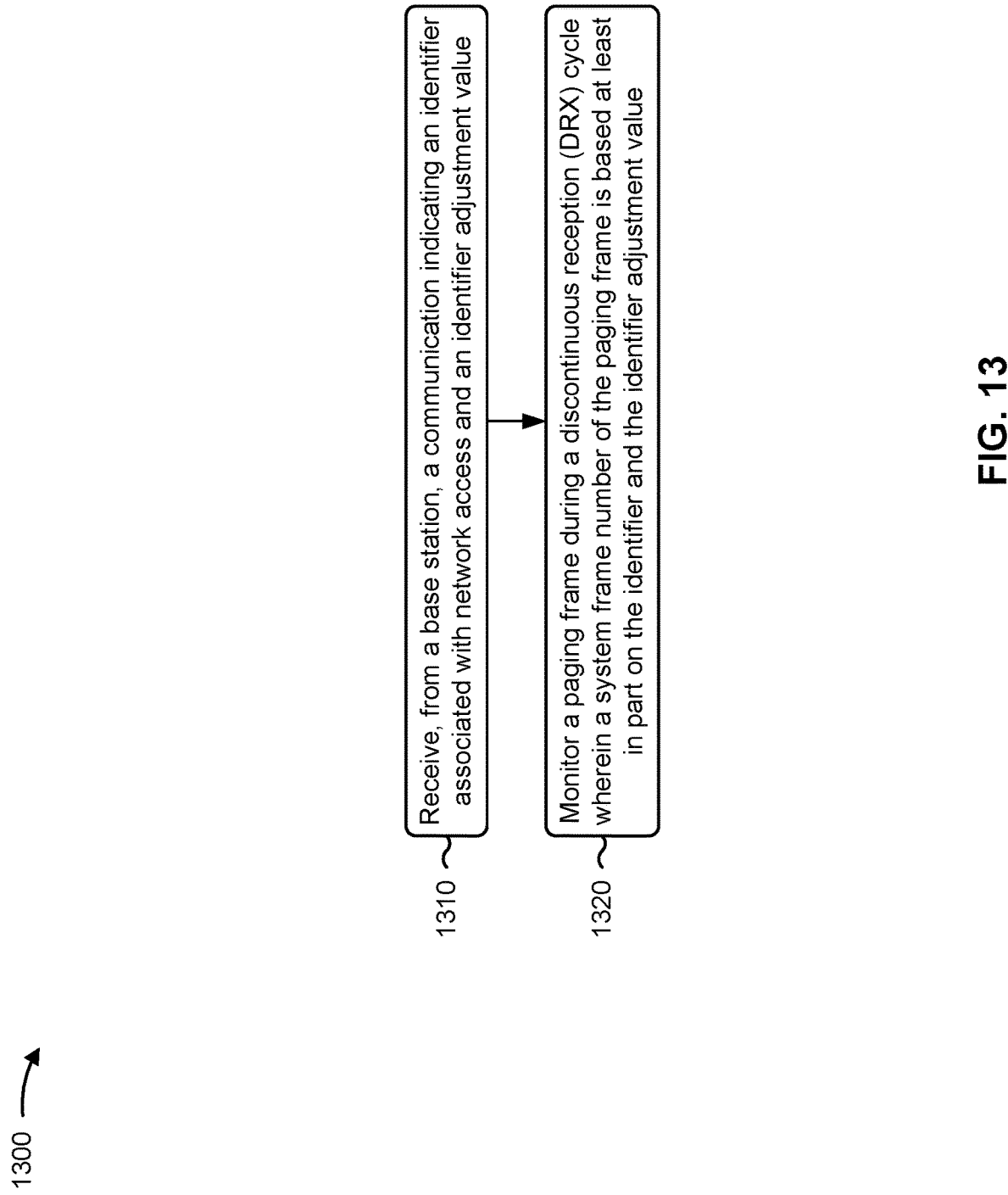

FIG. 13 is a diagram illustrating an example process 1300 performed, for example, by a UE, in accordance with the present disclosure. Example process 1300 is an example where the UE (e.g., UE 120) performs operations associated with aligning POs and synchronization signal.

As shown in FIG. 13, in some aspects, process 1300 may include receiving, from a base station, a communication indicating an identifier associated with network access and an identifier adjustment value (block 1310). For example, the UE (e.g., using communication manager 140 and/or reception component 1602, depicted in FIG. 16) may receive, from a base station, a communication indicating an identifier associated with network access and an identifier adjustment value, as described above.

As further shown in FIG. 13, in some aspects, process 1300 may include monitoring a PF during a DRX cycle, wherein a system frame number of the PF is based at least in part on the identifier and the identifier adjustment value (block 1320). For example, the UE (e.g., using communication manager 140 and/or monitoring component 1608, depicted in FIG. 16) may monitor a PF during a DRX cycle, wherein a system frame number of the PF is based at least in part on the identifier and the identifier adjustment value, as described above. In some aspects, a system frame number of the PF is based at least in part on the identifier and the identifier adjustment value.

Process 1300 may include additional aspects, such as any single aspect or any combination of aspects described below and/or in connection with one or more other processes described elsewhere herein.

In a first aspect, process 1300 includes determining the system frame number based at least in part on a number of frames per DRX cycle, a number of PFs per DRX cycle, the identifier, and the identifier adjustment value.

In a second aspect, alone or in combination with the first aspect, the system frame number indicates a frame that aligns SSB transmission frames with PFs of the UE.

In a third aspect, alone or in combination with one or more of the first and second aspects, the identifier adjustment value, when summed with the identifier and divided by a number of PFs per DRX cycle, has a remainder that, when used to determine the system frame number, aligns SSB transmission frames with PFs of the UE.

In a fourth aspect, alone or in combination with one or more of the first through third aspects, the communication comprises a RACH communication.

In a fifth aspect, alone or in combination with one or more of the first through fourth aspects, the identifier is an S-TMSI.

Although FIG. 13 shows example blocks of process 1300, in some aspects, process 1300 may include additional blocks, fewer blocks, different blocks, or differently arranged blocks than those depicted in FIG. 13. Additionally, or alternatively, two or more of the blocks of process 1300 may be performed in parallel.

Figure 14:
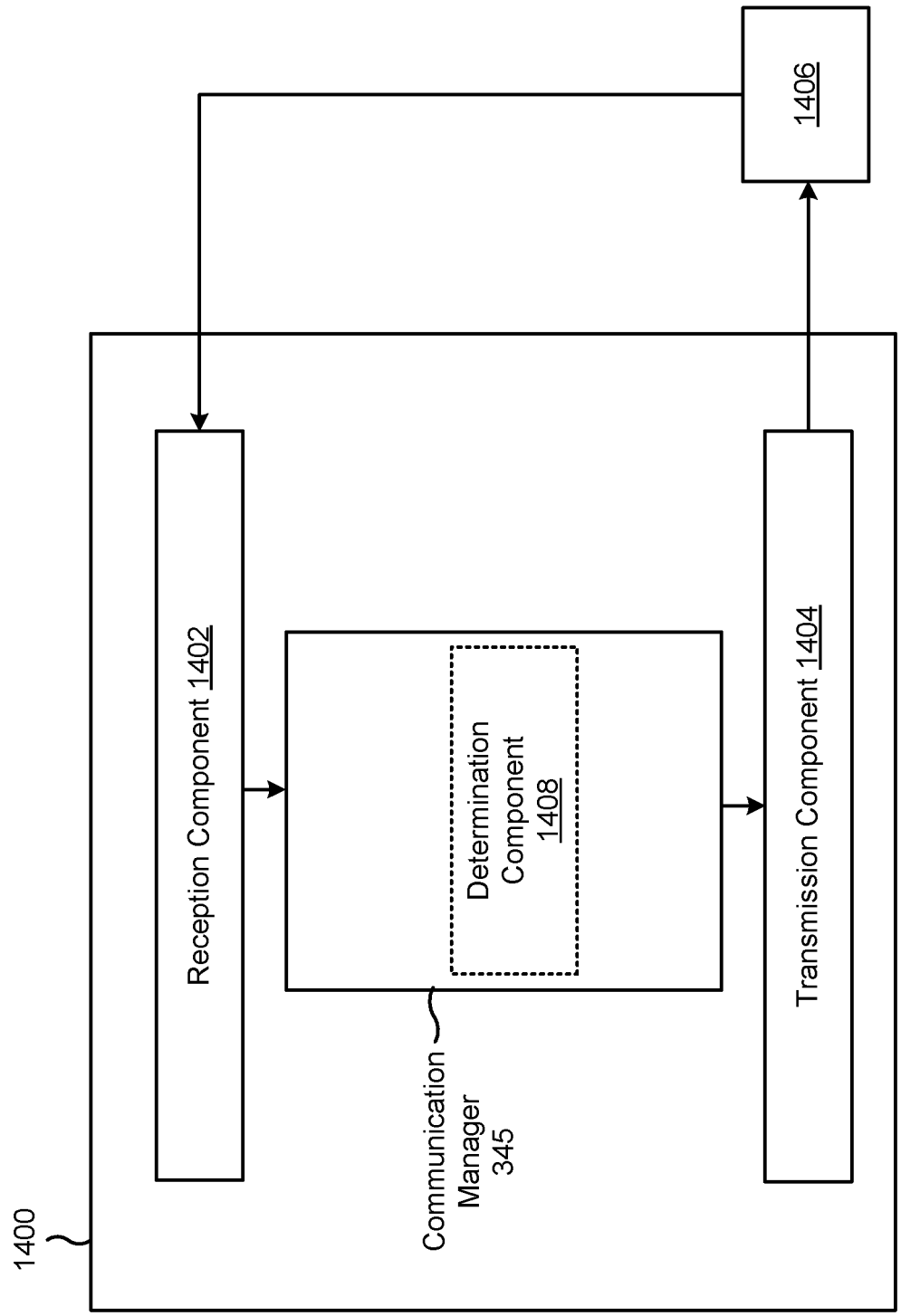
FIGS. 14-16 are diagrams of example apparatuses for wireless communication, in accordance with the present disclosure.

FIG. 14 is a diagram of an example apparatus 1400 for wireless communication. The apparatus 1400 may be a AMF, or a AMF may include the apparatus 1400. In some aspects, the apparatus 1400 includes a reception component 1402 and a transmission component 1404, which may be in communication with one another (for example, via one or more buses and/or one or more other components). As shown, the apparatus 1400 may communicate with another apparatus 1406 (such as a UE, a base station, or another wireless communication device) using the reception component 1402 and the transmission component 1404. As further shown, the apparatus 1400 may include the communication manager 345. The communication manager 345 may include a determination component 1408, among other examples.

In some aspects, the apparatus 1400 may be configured to perform one or more operations described herein in connection with FIGS. 4-13. Additionally, or alternatively, the apparatus 1400 may be configured to perform one or more processes described herein, such as process 1100 of FIG. 11. In some aspects, the apparatus 1400 and/or one or more components shown in FIG. 14 may include one or more components of the AMF described in connection with FIG. 2. Additionally, or alternatively, one or more components shown in FIG. 14 may be implemented within one or more components described in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 1402 may receive communications, such as reference signals, control information, data communications, or a combination thereof, from the apparatus 1406. The reception component 1402 may provide received communications to one or more other components of the apparatus 1400. In some aspects, the reception component 1402 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 1400. In some aspects, the reception component 1402 may include one or more antennas, a modem, a demodulator, a MIMO detector, a receive processor, a controller/processor, a memory, or a combination thereof, of the AMF described in connection with FIG. 2.

The transmission component 1404 may transmit communications, such as reference signals, control information, data communications, or a combination thereof, to the apparatus 1406. In some aspects, one or more other components of the apparatus 1400 may generate communications and may provide the generated communications to the transmission component 1404 for transmission to the apparatus 1406. In some aspects, the transmission component 1404 may perform signal processing on the generated communications (such as filtering, amplification, modulation, digital-to-analog conversion, multiplexing, interleaving, mapping, or encoding, among other examples), and may transmit the processed signals to the apparatus 1406. In some aspects, the transmission component 1404 may include one or more antennas, a modem, a modulator, a transmit MIMO processor, a transmit processor, a controller/processor, a memory, or a combination thereof, of the AMF described in connection with FIG. 2. In some aspects, the transmission component 1404 may be co-located with the reception component 1402 in a transceiver.

The reception component 1402 may receive, from a UE, a communication associated with a request for an identifier. The transmission component 1404 may transmit, to the UE, the identifier wherein the identifier is based at least in part on a SSB periodicity and a number of PFs per DRX cycle.

The determination component 1408 may determine, based at least in part on the SSB periodicity and the number of PFs per DRX cycle, the identifier.

The determination component 1408 may determine, based at least in part on the SSB periodicity and the number of PFs per DRX cycle, a set of reserved identifiers the set of reserved identifiers being reserved for UEs of a first type.

The reception component 1402 may receive, from a base station, information indicating the SSB periodicity.

The number and arrangement of components shown in FIG. 14 are provided as an example. In practice, there may be additional components, fewer components, different components, or differently arranged components than those shown in FIG. 14. Furthermore, two or more components shown in FIG. 14 may be implemented within a single component, or a single component shown in FIG. 14 may be implemented as multiple, distributed components. Additionally, or alternatively, a set of (one or more) components shown in FIG. 14 may perform one or more functions described as being performed by another set of components shown in FIG. 14.

Figure 15:
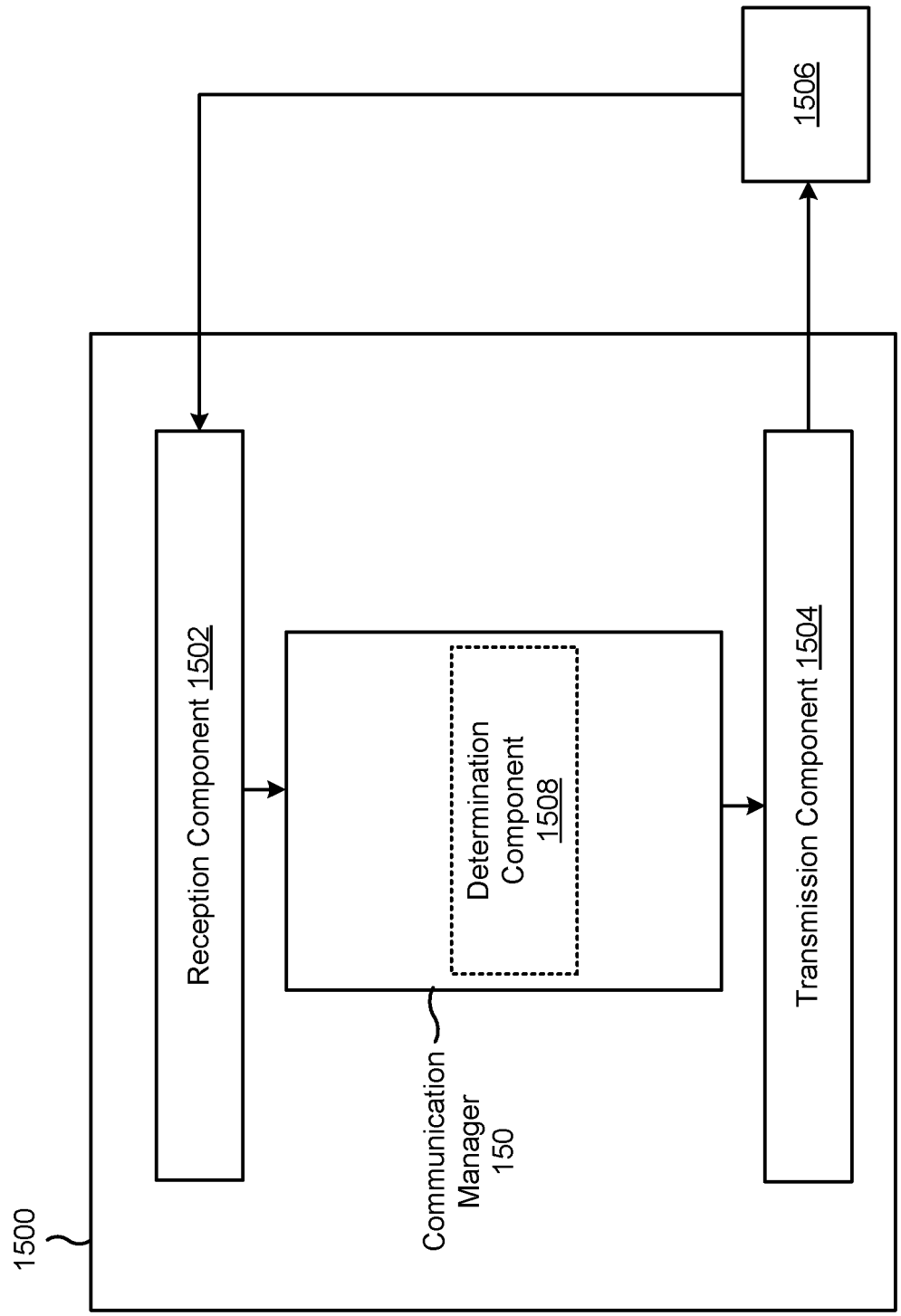

FIG. 15 is a diagram of an example apparatus 1500 for wireless communication. The apparatus 1500 may be a base station, or a base station may include the apparatus 1500. In some aspects, the apparatus 1500 includes a reception component 1502 and a transmission component 1504, which may be in communication with one another (for example, via one or more buses and/or one or more other components). As shown, the apparatus 1500 may communicate with another apparatus 1506 (such as a UE, a base station, or another wireless communication device) using the reception component 1502 and the transmission component 1504. As further shown, the apparatus 1500 may include the communication manager 150. The communication manager 150 may include a determination component 1508, among other examples.

In some aspects, the apparatus 1500 may be configured to perform one or more operations described herein in connection with FIGS. 4-13. Additionally, or alternatively, the apparatus 1500 may be configured to perform one or more processes described herein, such as process 1200 of FIG. 12. In some aspects, the apparatus 1500 and/or one or more components shown in FIG. 15 may include one or more components of the base station described in connection with FIG. 2. Additionally, or alternatively, one or more components shown in FIG. 15 may be implemented within one or more components described in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 1502 may receive communications, such as reference signals, control information, data communications, or a combination thereof, from the apparatus 1506. The reception component 1502 may provide received communications to one or more other components of the apparatus 1500. In some aspects, the reception component 1502 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 1500. In some aspects, the reception component 1502 may include one or more antennas, a modem, a demodulator, a MIMO detector, a receive processor, a controller/processor, a memory, or a combination thereof, of the base station described in connection with FIG. 2.

The transmission component 1504 may transmit communications, such as reference signals, control information, data communications, or a combination thereof, to the apparatus 1506. In some aspects, one or more other components of the apparatus 1500 may generate communications and may provide the generated communications to the transmission component 1504 for transmission to the apparatus 1506. In some aspects, the transmission component 1504 may perform signal processing on the generated communications (such as filtering, amplification, modulation, digital-to-analog conversion, multiplexing, interleaving, mapping, or encoding, among other examples), and may transmit the processed signals to the apparatus 1506. In some aspects, the transmission component 1504 may include one or more antennas, a modem, a modulator, a transmit MIMO processor, a transmit processor, a controller/processor, a memory, or a combination thereof, of the base station described in connection with FIG. 2. In some aspects, the transmission component 1504 may be co-located with the reception component 1502 in a transceiver.

The reception component 1502 may receive an identifier associated with a UE. The transmission component 1504 may transmit, to the UE, the identifier and an identifier adjustment value wherein the identifier adjustment value is based at least in part on the identifier, an SSB periodicity, and a number of PFs per DRX cycle.

The determination component 1508 may determine, based at least in part on the SSB periodicity and the number of PFs per DRX cycle, the identifier adjustment value.

The number and arrangement of components shown in FIG. 15 are provided as an example. In practice, there may be additional components, fewer components, different components, or differently arranged components than those shown in FIG. 15. Furthermore, two or more components shown in FIG. 15 may be implemented within a single component, or a single component shown in FIG. 15 may be implemented as multiple, distributed components. Additionally, or alternatively, a set of (one or more) components shown in FIG. 15 may perform one or more functions described as being performed by another set of components shown in FIG. 15.

Figure 16:
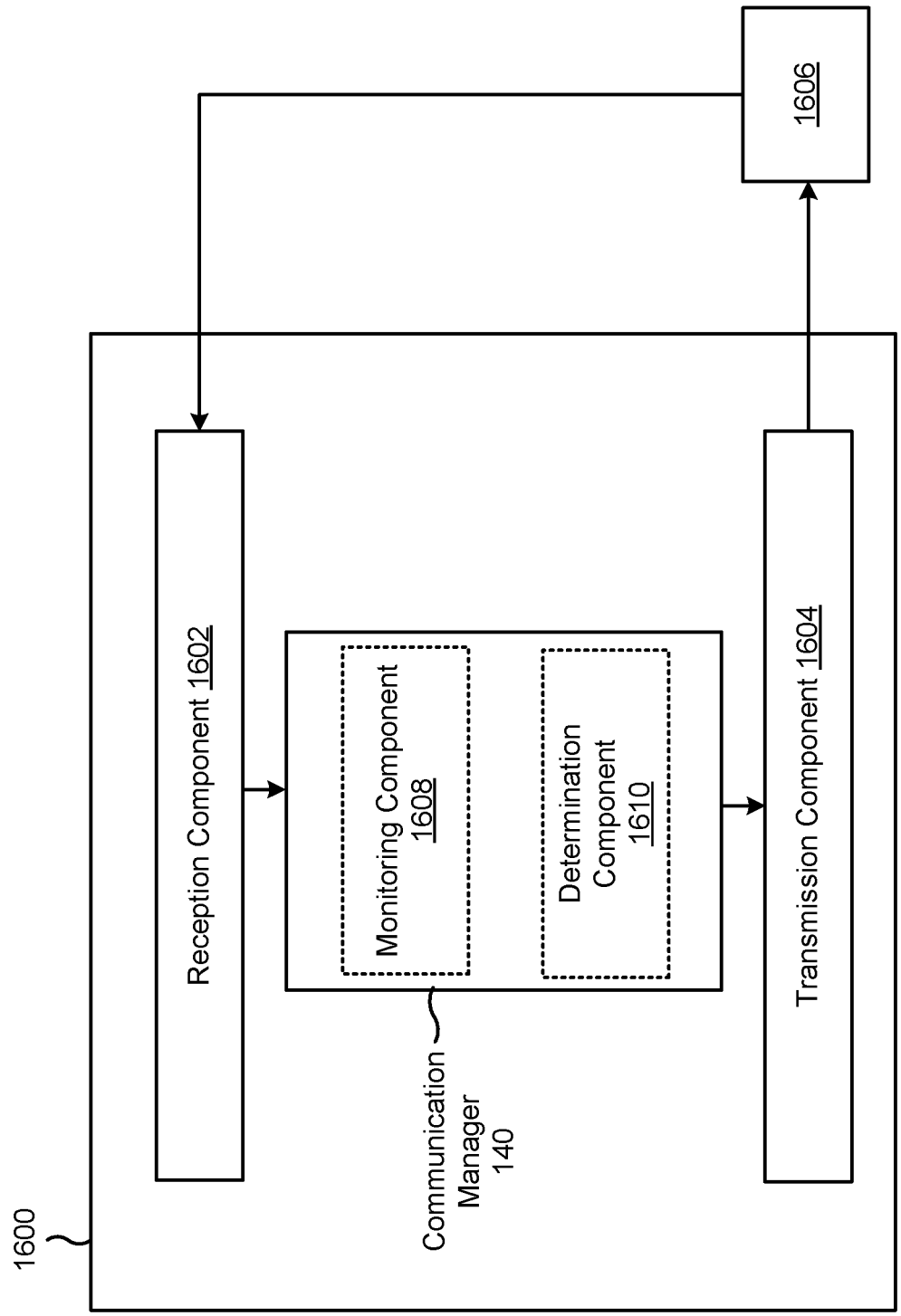

FIG. 16 is a diagram of an example apparatus 1600 for wireless communication. The apparatus 1600 may be a UE, or a UE may include the apparatus 1600. In some aspects, the apparatus 1600 includes a reception component 1602 and a transmission component 1604, which may be in communication with one another (for example, via one or more buses and/or one or more other components). As shown, the apparatus 1600 may communicate with another apparatus 1606 (such as a UE, a base station, or another wireless communication device) using the reception component 1602 and the transmission component 1604. As further shown, the apparatus 1600 may include the communication manager 140. The communication manager 140 may include one or more of a monitoring component 1608, or a determination component 1610, among other examples.

In some aspects, the apparatus 1600 may be configured to perform one or more operations described herein in connection with FIGS. 4-13. Additionally, or alternatively, the apparatus 1600 may be configured to perform one or more processes described herein, such as process 1300 of FIG. 13. In some aspects, the apparatus 1600 and/or one or more components shown in FIG. 16 may include one or more components of the UE described in connection with FIG. 2. Additionally, or alternatively, one or more components shown in FIG. 16 may be implemented within one or more components described in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 1602 may receive communications, such as reference signals, control information, data communications, or a combination thereof, from the apparatus 1606. The reception component 1602 may provide received communications to one or more other components of the apparatus 1600. In some aspects, the reception component 1602 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 1600. In some aspects, the reception component 1602 may include one or more antennas, a modem, a demodulator, a MIMO detector, a receive processor, a controller/processor, a memory, or a combination thereof, of the UE described in connection with FIG. 2.

The transmission component 1604 may transmit communications, such as reference signals, control information, data communications, or a combination thereof, to the apparatus 1606. In some aspects, one or more other components of the apparatus 1600 may generate communications and may provide the generated communications to the transmission component 1604 for transmission to the apparatus 1606. In some aspects, the transmission component 1604 may perform signal processing on the generated communications (such as filtering, amplification, modulation, digital-to-analog conversion, multiplexing, interleaving, mapping, or encoding, among other examples), and may transmit the processed signals to the apparatus 1606. In some aspects, the transmission component 1604 may include one or more antennas, a modem, a modulator, a transmit MIMO processor, a transmit processor, a controller/processor, a memory, or a combination thereof, of the UE described in connection with FIG. 2. In some aspects, the transmission component 1604 may be co-located with the reception component 1602 in a transceiver.

The reception component 1602 may receive, from a base station, a communication indicating an identifier associated with network access and an identifier adjustment value. The monitoring component 1608 may monitor a PF during a DRX cycle wherein a system frame number of the PF is based at least in part on the identifier and the identifier adjustment value.

The determination component 1610 may determine the system frame number based at least in part on a number of frames per DRX cycle, a number of PFs per DRX cycle, the identifier, and the identifier adjustment value.

The number and arrangement of components shown in FIG. 16 are provided as an example. In practice, there may be additional components, fewer components, different components, or differently arranged components than those shown in FIG. 16. Furthermore, two or more components shown in FIG. 16 may be implemented within a single component, or a single component shown in FIG. 16 may be implemented as multiple, distributed components. Additionally, or alternatively, a set of (one or more) components shown in FIG. 16 may perform one or more functions described as being performed by another set of components shown in FIG. 16.

The following provides an overview of some Aspects of the present disclosure:

Aspect 1: A method of wireless communication performed by a device, comprising: receiving, from a UE, a communication associated with a request for an identifier; and transmitting, to the UE, the identifier, wherein the identifier is based at least in part on a SSB periodicity and a number of PFs per DRX cycle.

Aspect 2: The method of Aspect 1, further comprising: determining, based at least in part on the SSB periodicity and the number of PFs per DRX cycle, the identifier.

Aspect 3: The method of Aspect 2, wherein determining the identifier comprises: determining, as the identifier, a value that aligns SSB transmission frames with PFs associated with the value as the identifier.

Aspect 4: The method of any of Aspects 1-3, further comprising: determining, based at least in part on the SSB periodicity and the number of PFs per DRX cycle, a set of reserved identifiers; and the set of reserved identifiers being reserved for UEs of a first type.

Aspect 5: The method of Aspect 4, wherein determining the set of reserved identifiers comprises: determining, as the set of reserved identifiers, potential identifiers that, when divided by the number of PFs per DRX cycle, have a remainder that, when expressed in frames within the DRX cycle and divided by the SSB periodicity in frames, has a remainder of zero.

Aspect 6: The method of any of Aspects 1-5, further comprising: receiving, from a base station, information indicating the SSB periodicity.

Aspect 7: The method of any of Aspects 1-6, wherein the identifier is further based on a type of the UE being one of a first type or a second type; wherein, when the type of the UE is the first type, the identifier is a first number that, when divided by the number of PFs per DRX cycle, has a first remainder that, when expressed in frames within the DRX cycle and divided by the SSB periodicity in frames, has a remainder of zero; and wherein, when the type of the UE is the second type, the identifier is a second number that, when divided by the number of PFs per DRX cycle, has a second remainder that, when expressed in frames within the DRX cycle and divided by the SSB periodicity in frames, has a non-zero remainder.

Aspect 8: The method of any of Aspects 1-7, wherein the identifier is further based on a type of the UE comprising a RedCap type.

Aspect 9: The method of any of Aspects 1-8, wherein the identifier is further based on a type of the UE comprising a UE type that supports a particular 3GPP release.

Aspect 10: The method of any of Aspects 1-9, wherein the identifier is further based on a type of the UE indicating a measure of battery life associated with the UE.

Aspect 11: The method of any of Aspects 1-10, wherein the identifier is further based on an SSB starting offset and a PF offset.

Aspect 12: The method of any of Aspects 1-11, wherein the device is an AMF device.

Aspect 13: The method of any of Aspects 1-12, wherein the communication is an RRC setup request.

Aspect 14: The method of any of Aspects 1-13, wherein the identifier is an S-TMSI.

Aspect 15: A method of wireless communication performed by a base station, comprising: receiving an identifier associated with a UE; and transmitting, to the UE, the identifier and an identifier adjustment value, wherein the identifier adjustment value is based at least in part on the identifier, an SSB periodicity, and a number of PFs per DRX cycle.

Aspect 16: The method of Aspect 15, further comprising: determining, based at least in part on the SSB periodicity and the number of PFs per DRX cycle, the identifier adjustment value.

Aspect 17: The method of Aspect 16, wherein determining the identifier adjustment value comprises: determining, as the identifier adjustment value, a value that aligns SSB transmission frames with PFs associated with the value as the identifier adjustment value.

Aspect 18: The method of any of Aspects 15-17, wherein determining the identifier adjustment value comprises: determining, as the identifier adjustment value, a value that, when summed with the identifier and divided by the number of PFs per DRX cycle, has a remainder that aligns SSB transmission frames with PFs of the UE.

Aspect 19: The method of any of Aspects 15-18, wherein the identifier adjustment value is further based on a type of the UE being one of a first type or a second type; wherein, when the type of the UE is the first type, the identifier is a first number that, when divided by the number of PFs per DRX cycle, has a first remainder that, when expressed in frames within the DRX cycle and divided by the SSB periodicity in frames, has a remainder of zero; and wherein, when the type of the UE is the second type, the identifier is a second number that, when divided by the number of PFs per DRX cycle, has a second remainder that, when expressed in frames within the DRX cycle and divided by the SSB periodicity in frames, has a non-zero remainder.

Aspect 20: The method of any of Aspects 15-19, wherein the identifier adjustment value is further based on a type of the UE comprising a reduced capability (RedCap) type.

Aspect 21: The method of any of Aspects 15-20, wherein the identifier adjustment value is further based on a type of the UE comprising a UE type that supports a particular 3GPP release.

Aspect 22: The method of any of Aspects 15-21, wherein the identifier adjustment value is further based on a type of the UE indicating a measure of battery life associated with the UE.

Aspect 23: The method of any of Aspects 15-22, wherein the identifier adjustment value is further based on an SSB starting offset and a PF offset.

Aspect 24: The method of any of Aspects 15-23, wherein the identifier is an S-TMSI.

Aspect 25: A method of wireless communication performed by a UE, comprising: receiving, from a base station, a communication indicating an identifier associated with network access and an identifier adjustment value; and monitoring a PF during a DRX cycle, wherein a system frame number of the PF is based at least in part on the identifier and the identifier adjustment value.

Aspect 26: The method of Aspect 25, further comprising: determining the system frame number based at least in part on a number of frames per DRX cycle, a number of PFs per DRX cycle, the identifier, and the identifier adjustment value.

Aspect 27: The method of any of Aspects 25-26, wherein the system frame number indicates a frame that aligns SSB transmission frames with PFs of the UE.

Aspect 28: The method of any of Aspects 25-27, wherein the identifier adjustment value, when summed with the identifier and divided by a number of PFs per DRX cycle, has a remainder that, when used to determine the system frame number, aligns SSB transmission frames with PFs of the UE.

Aspect 29: The method of any of Aspects 25-28, wherein the communication comprises a RACH communication.

Aspect 30: The method of any of Aspects 25-29, wherein the identifier is an S-TMSI.

Aspect 31: An apparatus for wireless communication at a device, comprising a processor; memory coupled with the processor; and instructions stored in the memory and executable by the processor to cause the apparatus to perform the method of one or more of Aspects 1-14.

Aspect 32: An apparatus for wireless communication at a device, comprising a processor; memory coupled with the processor; and instructions stored in the memory and executable by the processor to cause the apparatus to perform the method of one or more of Aspects 14-24.

Aspect 33: An apparatus for wireless communication at a device, comprising a processor; memory coupled with the processor; and instructions stored in the memory and executable by the processor to cause the apparatus to perform the method of one or more of Aspects 25-30.

Aspect 34: A device for wireless communication, comprising a memory and one or more processors coupled to the memory, the one or more processors configured to perform the method of one or more of Aspects 1-14.

Aspect 35: A device for wireless communication, comprising a memory and one or more processors coupled to the memory, the one or more processors configured to perform the method of one or more of Aspects 15-24.

Aspect 36: A device for wireless communication, comprising a memory and one or more processors coupled to the memory, the one or more processors configured to perform the method of one or more of Aspects 25-30.

Aspect 37: An apparatus for wireless communication, comprising at least one means for performing the method of one or more of Aspects 1-14.

Aspect 38: An apparatus for wireless communication, comprising at least one means for performing the method of one or more of Aspects 15-24.

Aspect 39: An apparatus for wireless communication, comprising at least one means for performing the method of one or more of Aspects 25-30.

Aspect 40: A non-transitory computer-readable medium storing code for wireless communication, the code comprising instructions executable by a processor to perform the method of one or more of Aspects 1-14.

Aspect 41: A non-transitory computer-readable medium storing code for wireless communication, the code comprising instructions executable by a processor to perform the method of one or more of Aspects 15-24.

Aspect 42: A non-transitory computer-readable medium storing code for wireless communication, the code comprising instructions executable by a processor to perform the method of one or more of Aspects 25-30.

Aspect 43: A non-transitory computer-readable medium storing a set of instructions for wireless communication, the set of instructions comprising one or more instructions that, when executed by one or more processors of a device, cause the device to perform the method of one or more of Aspects 1-14.

Aspect 44: A non-transitory computer-readable medium storing a set of instructions for wireless communication, the set of instructions comprising one or more instructions that, when executed by one or more processors of a device, cause the device to perform the method of one or more of Aspects 15-24.

Aspect 45: A non-transitory computer-readable medium storing a set of instructions for wireless communication, the set of instructions comprising one or more instructions that, when executed by one or more processors of a device, cause the device to perform the method of one or more of Aspects 25-30.

The foregoing disclosure provides illustration and description but is not intended to be exhaustive or to limit the aspects to the precise forms disclosed. Modifications and variations may be made in light of the above disclosure or may be acquired from practice of the aspects.

As used herein, the term "component" is intended to be broadly construed as hardware and/or a combination of hardware and software. "Software" shall be construed broadly to mean instructions, instruction sets, code, code segments, program code, programs, subprograms, software modules, applications, software applications, software packages, routines, subroutines, objects, executables, threads of execution, procedures, and/or functions, among other examples, whether referred to as software, firmware, middleware, microcode, hardware description language, or otherwise. As used herein, a "processor" is implemented in hardware and/or a combination of hardware and software. It will be apparent that systems and/or methods described herein may be implemented in different forms of hardware and/or a combination of hardware and software. The actual specialized control hardware or software code used to implement these systems and/or methods is not limiting of the aspects. Thus, the operation and behavior of the systems and/or methods are described herein without reference to specific software code, since those skilled in the art will understand that software and hardware can be designed to implement the systems and/or methods based, at least in part, on the description herein.

As used herein, "satisfying a threshold" may, depending on the context, refer to a value being greater than the threshold, greater than or equal to the threshold, less than the threshold, less than or equal to the threshold, equal to the threshold, not equal to the threshold, or the like.

Even though particular combinations of features are recited in the claims and/or disclosed in the specification, these combinations are not intended to limit the disclosure of various aspects. Many of these features may be combined in ways not specifically recited in the claims and/or disclosed in the specification. The disclosure of various aspects includes each dependent claim in combination with every other claim in the claim set. As used herein, a phrase referring to "at least one of" a list of items refers to any combination of those items, including single members. As an example, "at least one of: a, b, or c" is intended to cover a, b, c, a+b, a+c, b+c, and a+b+c, as well as any combination with multiples of the same element (e.g., a+a, a+a+a, a+a+b, a+a+c, a+b+b, a+c+c, b+b, b+b+b, b+b+c, c+c, and c+c+c, or any other ordering of a, b, and c).

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the terms "set" and "group" are intended to include one or more items and may be used interchangeably with "one or more." Where only one item is intended, the phrase "only one" or similar language is used. Also, as used herein, the terms "has," "have," "having," or the like are intended to be open-ended terms that do not limit an element that they modify (e.g., an element "having" A may also have B). Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A device for wireless communication, comprising:
one or more memories; and
one or more processors, coupled to the one or more memories, configured to:
receive, from a user equipment (UE), a communication associated with a request for an identifier associated with the UE; and
transmit, to the UE, the identifier associated with the UE, wherein the identifier associated with the UE is based at least in part on a synchronization signal block (SSB) periodicity and a number of paging frames per discontinuous reception (DRX) cycle.

2. The device of claim 1, wherein the one or more processors are further configured to:
determine, based at least in part on the SSB periodicity and the number of paging frames per DRX cycle, the identifier associated with the UE.

3. The device of claim 2, wherein the one or more processors, to determine the identifier associated with the UE, are configured to:
determine, as the identifier associated with the UE, a value that aligns SSB transmission frames with paging frames associated with the value as the identifier associated with the UE.

4. The device of claim 1, wherein the one or more processors are further configured to:
determine, based at least in part on the SSB periodicity and the number of paging frames per DRX cycle, a set of reserved identifiers; and
the set of reserved identifiers being reserved for UEs of a first type.

5. The device of claim 4, wherein the one or more processors, to determine the set of reserved identifiers, are configured to:
determine, as the set of reserved identifiers, potential identifiers that, when divided by the number of paging frames per DRX cycle, have a remainder that, when expressed in frames within the DRX cycle and divided by the SSB periodicity in frames, has a remainder of zero.

6. The device of claim 1, wherein the one or more processors are further configured to:
receive, from a base station, information indicating the SSB periodicity.

7. The device of claim 1, wherein the identifier associated with the UE is further based on a type of the UE being one of a first type or a second type;
wherein, when the type of the UE is the first type, the identifier associated with the UE is a first number that, when divided by the number of paging frames per DRX cycle, has a first remainder that, when expressed in frames within the DRX cycle and divided by the SSB periodicity in frames, has a remainder of zero; and
wherein, when the type of the UE is the second type, the identifier associated with the UE is a second number that, when divided by the number of paging frames per DRX cycle, has a second remainder that, when expressed in frames within the DRX cycle and divided by the SSB periodicity in frames, has a non-zero remainder.

8. The device of claim 1, wherein the identifier associated with the UE is further based on a type of the UE comprising a reduced capability (RedCap) type.

9. The device of claim 1, wherein the identifier associated with the UE is further based on a type of the UE comprising a UE type that supports a particular 3rd Generation Partnership Project (3GPP) release.

10. The device of claim 1, wherein the identifier associated with the UE is further based on a type of the UE indicating a measure of battery life associated with the UE.

11. The device of claim 1, wherein the identifier associated with the UE is further based on an SSB starting offset and a PF offset.

12. The device of claim 1, wherein the device is an access and mobility management function (AMF) device.

13. The device of claim 1, wherein the communication is a radio resource control (RRC) setup request.

14. The device of claim 1, wherein the identifier associated with the UE is a short temporary mobile subscription identifier (S-TMSI).

15. A base station for wireless communication, comprising:
one or more memories; and
one or more processors, coupled to the one or more memories, configured to:
receive an identifier associated with a user equipment (UE); and
transmit, to the UE, the identifier and an identifier adjustment value,
wherein the identifier adjustment value is based at least in part on the identifier, a synchronization signal block (SSB) periodicity, and a number of paging frames per discontinuous reception (DRX) cycle.

16. The base station of claim 15, wherein the one or more processors are further configured to:
determine, based at least in part on the SSB periodicity and the number of paging frames per DRX cycle, the identifier adjustment value.

17. The base station of claim 16, wherein the one or more processors, to determine the identifier adjustment value, are configured to:
determine, as the identifier adjustment value, a value that aligns SSB transmission frames with paging frames associated with the value as the identifier adjustment value.

18. The base station of claim 15, wherein the one or more processors, to determine the identifier adjustment value, are configured to:
determine, as the identifier adjustment value, a value that, when summed with the identifier and divided by the number of paging frames per DRX cycle, has a remainder that aligns SSB transmission frames with paging frames of the UE.

19. The base station of claim 15, wherein the identifier adjustment value is further based on a type of the UE being one of a first type or a second type;
   wherein, when the type of the UE is the first type, the identifier is a first number that, when divided by the number of paging frames per DRX cycle, has a first remainder that, when expressed in frames within the DRX cycle and divided by the SSB periodicity in frames, has a remainder of zero; and
   wherein, when the type of the UE is the second type, the identifier is a second number that, when divided by the number of paging frames per DRX cycle, has a second remainder that, when expressed in frames within the DRX cycle and divided by the SSB periodicity in frames, has a non-zero remainder.

20. The base station of claim 15, wherein the identifier adjustment value is further based on a type of the UE comprising a reduced capability (RedCap) type.

21. The base station of claim 15, wherein the identifier adjustment value is further based on a type of the UE comprising a UE type that supports a particular 3rd Generation Partnership Project (3GPP) release.

22. The base station of claim 15, wherein the identifier adjustment value is further based on a type of the UE indicating a measure of battery life associated with the UE.

23. The base station of claim 15, wherein the identifier adjustment value is further based on an SSB starting offset and a PF offset.

24. The base station of claim 15, wherein the identifier is a short temporary mobile subscription identifier (S-TMSI).

25. A user equipment (UE) for wireless communication, comprising:
   one or more memories; and
      one or more processors, coupled to the one or more memories, configured to:
         receive, from a base station, a communication indicating an identifier associated with network access and an identifier adjustment value; and
         monitor a paging frame during a discontinuous reception (DRX) cycle,
         wherein a system frame number of the paging frame is based at least in part on the identifier and the identifier adjustment value.

26. The UE of claim 25, wherein the one or more processors are further configured to:
   determine the system frame number based at least in part on a number of frames per DRX cycle, a number of paging frames per DRX cycle, the identifier, and the identifier adjustment value.

27. The UE of claim 25, wherein the system frame number indicates a frame that aligns SSB transmission frames with paging frames of the UE.

28. The UE of claim 25, wherein the identifier adjustment value, when summed with the identifier and divided by a number of paging frames per DRX cycle, has a remainder that, when used to determine the system frame number, aligns SSB transmission frames with paging frames of the UE.

29. The UE of claim 25, wherein the communication comprises a random access channel (RACH) communication.

30. A method of wireless communication performed by a device, comprising:
   receiving, from a user equipment (UE), a communication associated with a request for an identifier associated with the UE; and
   transmitting, to the UE, the identifier associated with the UE,
   wherein the identifier associated with the UE is based at least in part on a synchronization signal block (SSB) periodicity and a number of paging frames per discontinuous reception (DRX) cycle.

* * * * *